(12) United States Patent
Stahl et al.

(10) Patent No.: US 11,502,727 B2
(45) Date of Patent: Nov. 15, 2022

(54) CLASSIFICATION OF OBJECTS IN THE PROXIMITY OF AN NFC READER DEVICE

(71) Applicant: NXP B.V., Eindhoven (NL)

(72) Inventors: Johannes Stahl, Graz (AT); Ulrich Andreas Muehlmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/448,367

(22) Filed: Sep. 22, 2021

(65) Prior Publication Data

US 2022/0123785 A1  Apr. 21, 2022

(30) Foreign Application Priority Data

Oct. 20, 2020 (EP) .................................... 20202831

(51) Int. Cl.
*H04B 5/00* (2006.01)
(52) U.S. Cl.
CPC .................................. *H04B 5/0025* (2013.01)
(58) Field of Classification Search
CPC ...... H04B 5/0031; H04B 5/0037; H04B 1/40; H04B 5/02; H04B 5/0025; H04B 5/0068; H04B 1/3888; H04B 5/0075
See application file for complete search history.

(56) References Cited

U.S. PATENT DOCUMENTS

| | | |
|---|---|---|
| 6,476,708 B1 | 11/2002 | Johnson |
| 9,124,302 B2 | 9/2015 | Krishnan et al. |
| 9,301,337 B2 * | 3/2016 | Brown .................. H04W 88/06 |
| 9,742,470 B2 * | 8/2017 | Royston ................ H04L 63/061 |
| 9,819,401 B2 | 11/2017 | Karandikar et al. |
| 10,360,420 B2 * | 7/2019 | Li .......................... G06F 16/786 |

(Continued)

FOREIGN PATENT DOCUMENTS

| | | |
|---|---|---|
| EP | 1148437 A2 | 10/2001 |
| EP | 2107495 A2 | 10/2009 |
| EP | 3173968 A1 | 5/2017 |

OTHER PUBLICATIONS

Chen, Szi-Wen et al.; "A two-Stage Discrimination of Cardiac Arrhythmias Using a Total Least Squares-Based Prony Modeling Algorithm"; IEEE Transactions on Biomedical Engineering, Oct. 2000; DOI: DOI: 10.1109/10.871404.

(Continued)

*Primary Examiner* — Nhan T Le

(57) ABSTRACT

Disclosed is a method for determining a type of an object arranged in a radio frequency, RF, field transmitted by an NFC reader device. This method involves analyzing the oscillatory behavior in the NFC reader device, after the RF field transmitted by the reader has been switched off, using a decomposition scheme with a degree M for decomposing a decay signal trace into M superimposed components. The method involves predetermining the decomposition scheme with a degree M for decomposing a decay signal trace into M superimposed components, e.g. weighted oscillation components, wherein each one of said M superimposed components is defined by a predetermined superimposition function, which in turn is determined by an associated set of characteristic parameters, and storing, e.g. in a database that is accessible for the P&E unit, an indication of the decomposition scheme and the M predetermined superimposition functions.

17 Claims, 11 Drawing Sheets

(56) References Cited

U.S. PATENT DOCUMENTS 10,511,347 B2    12/2019  Huebner et al.
10,671,822 B1 *   6/2020  Turner .............. G06K 7/10079

OTHER PUBLICATIONS

Hua, Yingbo et al.; "Matrix Pencil Method for Estimating Parameters of Exponentially Damped/Undamped Sinusoids in Noise"; IEEE Transactions on Acoustics, Speech, and Signal Processing, May 1990; DOI: 10.1109/29.56027.
Markovsky, Ivan et al.; "Overview of Total Least-Squares Methods"; Signal Processing, vol. 87, Issue 10; Oct. 2007; DOI: https://doi.org/10.1016/j.sigpro.2007.04.004.
Rodriguez, A. Fernandez, et al.;" Coding Prony's Method in MATLAB and Applying it to Biomedical Signal Filtering"; BMC Bioinformatics; Nov. 26, 2018; DOI: 10.1186/s12859-018-2473-y.
ISO/IEC FCD 14443-3, Final Committee Draft; "Identification cards—Contactless integrated circuit(s) cards—Proximity cards—Part 3: Initialization and anticollision"; Jun. 11, 1999.

* cited by examiner

CLASSIFICATION OF OBJECTS IN THE PROXIMITY OF AN NFC READER DEVICE

CROSS-REFERENCE TO RELATED APPLICATIONS

This application claims priority under 35 U.S.C. § 119 to European Patent Application No. 20202831.2, filed on Oct. 20, 2020, the contents of which are incorporated by reference herein.

TECHNICAL AREA

The present disclosure relates to classification of objects in the proximity of a near-field communication (NFC) reader device, in particular to a method for determining a type of an object arranged in a radio frequency (RF) field transmitted by an NFC reader device, and an NFC reader device capable to perform this method. The present disclosure further relates to a method for gathering a set of training data that characterize signals that have been caused by bringing training objects from a training group of types of objects into the RF field of an NFC reader device, and an NFC reader device capable to perform this method. The present disclosure further relates to a machine-readable non-transitional storage medium storing a computer program product, or a computer program product, which comprises instructions, which when executed are configured to control or execute the methods.

TECHNICAL BACKGROUND

Near-field communication (herein: NFC) is an international transmission standard, which is based on radio-frequency identification (RFID) technology, for contactless exchange of data by electromagnetic induction by means of loosely coupled antenna coils via short distances of a few centimeter and a data transmission rate of normally at up to 848 kBit/s. Until now, this technology is used primarily in the area of micropayment—contactless payment of small (monetary) amounts, and also in the areas of fare collection and car access systems using e.g. dedicated key tokens or smartphones, having NFC functionality.

FIG. 1 shows a conventional NFC arrangement comprising a polling NFC device, which operates as an NFC reader device 100, and a listening NFC device, which may also be referred to as an NFC tag 150, such as for example a smart card, a smartphone, or a tablet having NFC functionality.

In a normal mode of operation of the NFC arrangement shown in FIG. 1, when a listening NFC device, i.e. an NFC tag 150, enters in an RF field 140 transmitted by the polling NFC device, i.e. the NFC reader device 100, the NFC reader device 100 and the NFC tag 150 establish a coupling in respect of the exchange of data. The NFC reader device 100, which is by default in a transmitting mode, may transmit commands and data (not shown), including requests for data. The NFC tag 150, which is by default in a receiving mode, receives these commands and data in the receiving mode, processes them, switches temporarily to a transmitting mode, and may transmit the requested data (not shown) for receipt by the polling NFC reader device 100. The NFC reader device 100 switches temporarily to a receiving mode, and may receive the data transmitted by the NFC tag 150.

In order to provide such functionality, the NFC reader device 100 comprises an NFC device 120, which in turn comprises a receiver 122, a processing and evaluation unit (herein: P&E unit) 124, and a transmitter 126; an antenna interface 128; and an antenna 130, which is typically implemented as an antenna coil. The antenna interface 128 and the receiver 122 may be referred to as a front-end of the device 100. When the NFC reader device 100 is in the transmitting mode, the signal flow proceeds from the P&E unit 124 to the transmitter 1126 as a signal 134, further from the transmitter 126 to the antenna interface 128 as a signal 135, further from the antenna interface 128 to the antenna 1130 as a signal 136, and then from the antenna 1130 as a transmitted RF signal (not shown) associated by a transmitted RF field 140 into the air. When the NFC reader device 100 is in the receiving mode, the signal flow proceeds from an RF signal (not shown) received by the antenna 130, from the antenna 130 to the antenna interface 128 as a received RF input signal 131, further from the antenna interface 128 to the receiver 122 as a signal 1132, and further from the receiver 122 to the P&E unit 124 as a front-end processed received signal 133.

As shown in FIG. 1, the NFC arrangement comprising the polling device 100 and the listening device 150 is "symmetrical" in the sense that the polling device 100 is configured and capable to transmit data to a listening NFC device 150, and is also configured and capable to receive data from a listening NFC device 150, via an RF field 140, and further in the sense that the listening NFC device 150 is configured and capable to transmit data to a polling NFC device 100, and is also configured and capable to receive data from a polling NFC device 100, also via an RF field 140.

In order to enable a symmetry of the NFC arrangement comprising the polling device 100 and the listening device 150, the listening NFC device, i.e. the NFC tag 150, may be implemented functionally similarly to the polling device 100, and as such may comprise an NFC device, which in turn comprises a receiver 162, a P&E unit 164, and a transmitter 166; an antenna interface 168; and an antenna 170, which is typically implemented as an antenna coil. When the NFC tag 150 is in the receiving mode, the signal flow proceeds from an RF signal (not shown) received by the antenna 170, from the antenna 170 to the antenna interface 168 as a received RF input signal 171, further from the antenna interface 168 to the receiver 162 as a signal 172, and further from the receiver 162 to the P&E unit 1164 as a front-end processed received signal 173. When the NFC tag 150 is in the transmitting mode, the signal flow proceeds from the P&E unit 164 to the transmitter 166 as a signal 174, further from the transmitter 166 to the antenna interface 168 as a signal 175, further from the antenna interface 168 to the antenna 170 as a signal 176, and then from the antenna 170 as a transmitted RF signal (not shown) associated by a transmitted RF field (not shown) into the air.

Each one of the polling NFC device 100 and the listening NFC device 150 may be a portable device, for example a smartphone or a tablet having NFC functionality as explained above, while the polling NFC device 100 may be a stationary device and operate as an NFC reader device 100, such as for example a card reader (wherein the expression "reader" refers to the capability of the card reader to read out portable-device-specific data from the listening device or NFC tag 150).

NFC communication is normally initiated by the polling NFC device 100, e.g. the NFC reader device 100, and after successful reception, the listening NFC device, i.e. the NFC tag 150, will respond with a corresponding answer. The NFC tag 150 will respond with active or passive load modulation techniques. When in coupling via an RF field, e.g. the RF field 140, both devices 100 and 150 are arbitrary displaced in a proximity volume of a couple of centimeters, leading to an arbitrary coupling between the antennas 130, 170 of the devices 100, 150, which in turn results in different received RF input signals 131 that may vary in signal amplitude and phase as a function of the distance and the orientation of the NFC tag 150 relative to the NFC reader device 100.

NFC devices, such as the NFC reader device 100 shown in FIG. 1, which operate as a reader, need to periodically poll for NFC tags, such as the NFC tag 150 shown in FIG. 1, which are placed in their vicinity. The polling mechanism causes non-negligible current consumption in the reader, which becomes problematic in cases of battery powered devices. Thus, battery powered NFC reader devices often provide a so-called low power card detection (LPCD) feature, which circumvents the need to periodically poll for NFC tags. If the LPCD is more power-efficient than the polling mechanism, the overall current consumption can be reduced. State-of-the-art LPCD implementations are usually highly sensitive to metal objects, which are brought in the RF field transmitted by the reader, i.e. they may be detected as NFC tags.

U.S. Pat. No. 9,124,302 B2 discloses systems and methods for carrier frequency variation for device detection in near-field communications. A parameter is measured while the transmitter applies a signal with a specific frequency to the device's matching network. The frequency is varied, and a peak value of the measured parameter is found (corresponding to the resonance of the overall system). If the peak value exceeds a certain threshold, this is interpreted as the detection of a device.

U.S. Pat. No. 6,476,708 B1 discloses a method of detecting an RFID device by an RF reader unit operating in a reduced power state. The method involves detecting RFID tags based on decay time measurements.

U.S. Pat. No. 10,511,347 B2 discloses a method of device detection in contactless communication systems. The method involves tracking changes in the output of an oscillator that is oscillating at the boundary of its stability. The problem of confusing metal objects and NFC tags is solved by doing a regular poll.

U.S. Pat. No. 9,819,401 B2 discloses a highly selective low-power card detector for near field communications (NFC) and a method of operation, which involves detecting a reflective impedance by using an oscillator to stimulate the system, and comparing the oscillator's amount of oscillation to a threshold.

SUMMARY OF THE PRESENT DISCLOSURE

It is a general object of the present disclosure to provide a method for increasing the efficiency of low power card detection (LPCD) approaches. This may generally be achieved, according to embodiment examples of the present disclosure, by determining a type of object that has entered an RF field transmitted by an NFC reader device or an NFC enabled reader device, and in particular to distinguish NFC tags from other non-relevant objects in the RF field emitted by the NFC or NFC enabled reader device.

In particular, it is an object of the present disclosure to provide a method for distinguishing NFC tags from other, non-relevant objects.

According to embodiment examples of the present disclosure, this is achieved by analyzing the oscillatory behavior of the NFC arrangement, in particular in the NFC reader device, after the RF field transmitted by the reader has been switched off.

These objects are solved by the subjects having the features according to the independent patent claims. In particular, this object is solved by a method for determining a type of an object arranged in an RF field transmitted by an NFC reader device according to the appended independent claim 1, and by an NFC reader device according to the appended independent claim 14 capable to perform said method. Said method for distinguishing relies on having accessible a training set of data. Accordingly, there is also provided a method of acquiring a training data set for an NFC reader device for a plurality of training objects according to the appended independent claim 11, and an NFC reader device according to the appended independent claim 14 capable to perform said method of acquiring. Furthermore, there is provided for a machine-readable non-transitional storage medium storing a computer program product, or a computer program product as such, comprising instructions that are configured to control or execute the method for distinguishing and/or the method of acquiring, according to the appended independent claim 15. Further embodiment examples of the present disclosure are described in the dependent claims.

According to a first aspect of the present disclosure, there is provided a method for determining a type of an object arranged in a radio frequency, RF, field transmitted by a near field communication, NFC, reader device, in particular an NFC enabled reader device, wherein the type of object is from a predetermined group of types of objects. The NFC reader device has an RF antenna for transmitting an RF field and for receiving an RF input signal, and a received signal processing chain for front-end processing a received RF input signal and for providing as its output a front-end processed, received signal, x, corresponding to the received RF input signal. The method has the following steps:

a) for an object that is in an RF field transmitted from the NFC reader device, after switching off the transmitted RF field, measuring and recording a decay signal trace of a front-end processed received signal caused by said object in the RF field;

b) estimating a decomposition of a degree M according to a predetermined decomposition scheme, of the recorded decay signal trace caused by said object into M superimposed components of the decomposition scheme, and thereby determining, and in particular storing, for each superimposed component, an associated set of estimated characteristic parameters of the superimposed component, wherein each one of said M superimposed components is determined by a predetermined superimposition function, which in turn is determined by an associated set of characteristic parameters;

c) on the basis of at least one of the determined estimated characteristic parameters of the M superimposed components according to the decomposition scheme, attempting a classification of said at least one of the characteristic parameters with respect to a training data set of training characteristic parameters of the M superimposed components; and, in particular, d) if the classification of said M estimated characteristic parameters is successful, on the basis of the successful classification, determining the type of object, for which the decay signal trace has been recorded in step a).

Estimating the decomposition into M oscillatory components, and attempting the classification on the basis the stored M estimated characteristic parameters of the M oscillatory components according to the decomposition scheme, not only enable a determination of the presence of an object that is, or has been, in the transmitted RF field, but may even enable a determination of the type of the object that is, or has been, in the transmitted RF field.

It is noted that whether or not different types of objects can be distinguished, in other words whether or not a classification can be successful, depends among others on the quality of the training data set, the selection of the decomposition scheme, and the distance and relative orientation of an object to the RF antenna.

According to a second aspect of the present disclosure, there is provided a method of acquiring, in particular in a database, a training data set for an NFC reader device, in particular an NFC enabled reader device, for a plurality of training objects from a training group of types of objects, wherein the training data comprise a plurality of recorded training decay signal traces for each of at least one training object of a type that is selected from the training group of types of objects. The NFC reader device has an RF antenna for transmitting an RF field and for receiving an RF input signal, and a received signal processing chain for front-end processing a received RF input signal and for providing as its output a front-end processed, received signal, x, corresponding to the received RF input signal. The method has the following steps:

1) predetermining a training group of types of objects;
2) predetermining a decomposition scheme with a degree M for decomposing a decay signal trace into M superimposed components, wherein each one of said M superimposed components is defined by a predetermined superimposition function, which in turn is determined by an associated set of characteristic parameters, and storing, in particular in a database that is accessible for the P&E unit, an indication of the decomposition scheme and the M predetermined superimposition functions;
3) for each predetermined type of objects:
3.1) providing a plurality of different training objects of said predetermined type of objects,
3.2) sequentially bringing each training object of the provided plurality of different training objects into a transmitted RF field of the NFC reader device,
3.3) for each training object that is in a transmitted RF field of the NFC reader device, performing the following steps:
3.3.1) after switching off the RF field of the NFC reader device, measuring and recording, in particular in the database, a training decay signal trace of a front-end processed received signal caused by said training object in the RF field,
3.3.2) estimating a decomposition of degree M of the recorded training decay signal trace according to the predetermined decomposition scheme into M superimposed components, and thereby determining, and in particular storing, in particular in the database, for each superimposed component, an associated set of determined characteristic training parameters of the superimposed component of the estimated decomposition of the training decay signal trace caused by the training object in the RF field.

According to a third aspect of the present disclosure, there is provided an NFC reader device, in particular an NFC enabled reader device, configured to perform the method according to the first aspect of the present disclosure and/or configured to perform the method according to the second aspect of the present disclosure.

According to a fourth aspect of the present disclosure, there is provided a machine-readable, non-transitional storage medium storing a computer program product, or a computer program product, which comprises instructions, which when executed on a data processing system, such as a processor, a micro-processor, or a computer control or execute the method according to the first aspect of the present disclosure and/or the method according to the second aspect of the present disclosure.

In an embodiment of the method according to the first aspect, the group of types of objects comprises at least one of an NFC tag, a metal object and a no loading with any object. In a preferred embodiment, the group of types of objects comprises at least one of an NFC tag, an object made of copper, an object made of aluminium, an object made of steel, and a no loading with any object; that is, for a metal object, it can be distinguished whether the metal is one of copper, aluminium, and steel.

In an embodiment of the method according to the first aspect, the NFC reader device may have a processing and evaluation, P&E, unit for processing and evaluating a front-end processed received signal, wherein in step a) the decay signal trace is recorded and stored in the P&E unit, and wherein step b), step c), and step d) are performed in the P&E unit.

In an embodiment of the method according to the first aspect, the training data set may be stored in a database that may be accessible to the P&E unit and may have been obtained during a training phase for the NFC reader device using a plurality of training objects from each type of object in the predetermined group of types of objects.

In an embodiment of the method according to the first aspect, the measuring and recording of the decay signal trace in step a) may comprise: recording a time dependency of the decay signal trace during a time interval that starts at or after the time of the switching off of the RF field, in particular that starts after a predetermined time delay after the time of the switching off of the RF field.

Herein, the decay signal values are complex-valued.

In an embodiment of the method according to the first aspect, the estimating the decomposition of a degree M according to a predetermined decomposition scheme in step b) comprises fitting the decomposition of the degree M to the recorded decay signal trace by varying the M estimated characteristic parameters of the estimated decomposition.

In a particular embodiment of the method according to the first aspect, the measuring and recording of the decay signal trace in step a) may comprise: recording a time dependency of the decay signal trace in the form of a time series of signal values x[n], wherein n denotes a discrete time index, wherein x[n] is complex-valued and has:
a real part, real (x[n]), and an imaginary part, imag (x[n]), and/or
an absolute value, |x[n]|, and an angle, ∠x[n].

In an implementation of this particular embodiment of the method, the estimating a decomposition of degree M of the recorded decay signal trace in step b) may comprise: modelling the time series of signal values x[n] as a sum of M superimposed components $x_m[n]$ plus a term d[n] representing white noise according to:

$$x[n] = d[n] + \sum_{m=1}^{M} x_m[n], \text{ with } n \in [0, N-1], \quad (1)$$

wherein N is the number of measured signal samples, n is a discrete time index corresponding to a measured signal sample, m is an index denoting a superimposed component $x_m[n]$ with m=[1, M], M is the number of superimposed components $x_m[n]$ admitted in the decomposition, and n, N, and M are integers.

In this implementation, the M superimposed components $x_m[n]$ may represent a decomposition of the decay signal trace into a set of superimposition functions. This set may be selected from a group of sets that consists of: a set of oscillatory functions, in particular a set of weighted oscillatory functions, a set of sinusoidal functions, in particular a set of weighted sinusoidal functions, a set of impulse functions, in particular a set of weighted impulse functions, and a set of step functions, in particular a set of weighted step functions.

In another implementation of the above-mentioned particular embodiment of the method, the estimating a decomposition of degree M of the recorded decay signal trace in step b) may comprise: modelling the time series of signal values $x[n]$ as a sum of M oscillatory components $a_m z_m^n$ plus a term $d[n]$ representing white noise according to $$x[n] = d[n] + \sum_{m=1}^{M} a_m z_m^n, \text{ with } n \in [0, N-1], \quad (2)$$

wherein N is the number of measured signal samples, n is a discrete time index corresponding to a measured signal sample, m is an index denoting a weighted oscillation component $a_m z_m^n$ with m=[1, M], M is the number of weighted oscillation components admitted in the decomposition, and n, N, in, and M are integers. Herein, each superimposed component may be represented as a weighted oscillation component $a_m z_m^n$, wherein $z_m$ is a complex-valued oscillatory parameter according to the predetermined decomposition scheme, $z_m^n := z_m[n]$ represents an oscillation function associated to $z_m$ and is namely the n-th value of the oscillation function corresponding to the discrete time index n, and $a_m$ is a complex-valued weight parameter.

In this other implementation, an oscillatory component $x_m[n] = a_m z_m^n$ may be given as a function of time by:

$$x_m[n] = a_m z_m^n = a_m(|z_m|e^{i\angle z_m})^n = a_m|z_m|^n e^{i\angle z_m n} \quad (3)$$

In this other implementation, the complex-valued oscillatory parameter $z_m$ may be mapped to the oscillation function of the discrete time index n by $$z_m^n = (|z_m|e^{i\angle z_m})^n = |z_m|^n e^{i\angle z_m n}. \quad (4)$$

Further in this other implementation, the linear frequency $f_m$ of oscillatory component in and $\angle z_m$ are connected as follows $$\angle z_m = 2\pi \frac{f_m}{f_s}, \quad (5)$$

wherein $f_s$ denotes the sampling frequency.

In this other implementation, each weighted oscillation component $a_m z_m^n$ may be represented by a subset of characteristic parameters. This subset may comprise the absolute value of the weight parameter, i.e. $|a_m|$, the angle of the weight parameter, i.e. $\angle a_m$, the absolute value of the oscillatory parameter, $|z_m|$, the angle of the oscillatory parameter, i.e. $\angle z_m$. Herein, each subset of characteristic parameters can be summarized as a vector $\theta_m$:

$$\theta_m^T = [|a_m| \ \angle a_m \ |z_m| \ \angle z_m], \quad (6)$$

wherein $\bullet^T$ indicates a transposed vector, and
wherein a parameter matrix $\theta$ is defined in terms of the vectors $\theta_m$ as:

$$\Theta = [\theta_1 \ \theta_2 \ ... \ \theta_M], \quad (7)$$

such that the parameter matrix $\theta$ contains a complete set of characteristic parameters for all M superimposed components.

Further in this other implementation, the absolute value of a respective weight parameter may correspond to a scaling of the oscillatory component, the angle of a respective weight parameter may correspond to a phase shift of the oscillatory component. Still further in this other preferred implementation, the absolute value of the oscillatory parameter may correspond to the damping of the oscillation function, and the angle of the oscillatory parameter may correspond to a frequency of the oscillation function.

Further in this other implementation, the attempting a classification of said M characteristic parameters with respect to the training data set may comprise: performing a classification of a subset of characteristic parameters including at least one of: the absolute value of the weight parameter, the angle of the weight parameter. Further, the absolute value of oscillatory parameter, and the angle of the oscillatory parameter for M=3, that is for m=1, 2, and 3, preferably for M=2, that is for m=1, and 2, and more preferably for M=1, that is for m=1, with respect to a corresponding set of training characteristic parameters included in a training data set.

In an embodiment of the method according to the first aspect, the estimating the decomposition of degree M of the recorded decay signal trace and the determining the associated set of estimated characteristic parameters in step b) comprises a fitting the decomposition of the degree M to the recorded decay signal trace by varying the characteristic parameters of the associated set of characteristic parameters of the superimposed component of the estimated decomposition, wherein the determining the associated set of characteristic parameters involves a mathematical method that is selected from the group Prony's method, pencil-of-function methods, and (total) least squares estimators;

In an embodiment of the method according to the first aspect, the attempting a classification in step c) may involve a mathematical method that is selected from a group that consists of: a Bayesian classification, a support vector machine, and an artificial neural network.

In an embodiment of the method according to the second aspect of the present disclosure, the training group of types of objects comprises at least one of an NFC tag, a metal object and a no loading with any object, In an embodiment of the method according to the second aspect, the NFC reader device may have a processing and evaluation, P&E, unit for processing and evaluating a front-end processed received signal.

In an embodiment of the method according to the second aspect, the NFC reader device has a database that is accessible for the P&E unit.

In an embodiment of the method according to the second aspect, in step 2), the storing of an indication of the decomposition scheme and the M predetermined superimposition functions is performed in a database that is accessible for the P&E unit, wherein in step 3.3.1) the training decay signal trace is stored in the database, and wherein in step 3.3.2) the characteristic training parameters are stored in the database.

In a particular embodiment of the method according to the second aspect, the measuring and recording in the database in step 3.3.1) may comprise: recording a time dependency of the training decay signal trace in the form of a time series of training signal values x[n], wherein n denotes a discrete time index, wherein x[n] is complex-valued and has:
- a real part, real (x[n]), and an imaginary part, imag (x[n]), and/or
- an absolute value, |x[n]|, and an angle, ∠x[n].

In an implementation of this particular embodiment of the method according to the second aspect, the estimating a decomposition of degree M of the recorded decay signal trace in step b) may comprise: modelling the time series of signal values x[n] as a sum of M superimposed components $x_m[n]$ plus a term d[n] representing white noise according to:

$$x[n] = d[n] + \sum_{m=1}^{M} x_m[n], \text{ with } n \in [0, N-1], \quad (1')$$

wherein N is the number of measured signal samples, n is a discrete time index corresponding to a measured signal sample, m is an index denoting a superimposed component $x_m[n]$ with m=[1, M], M is the number of superimposed components $x_m[n]$ admitted in the decomposition, and n, N, m, and M are integers.

In this implementation, the M superimposed components $x_m[n]$ may represent a decomposition of the decay signal trace into a set of superimposition functions. This set may be selected from a group of sets that consists of: a set of oscillatory functions, in particular a set of weighted oscillatory functions, a set of sinusoidal functions, in particular a set of weighted sinusoidal functions, a set of impulse functions, in particular a set of weighted impulse functions, and a set of step functions, in particular a set of weighted step functions.

In another implementation of the above-mentioned particular embodiment of the method according to the second aspect, the estimating the predetermined decomposition of degree M in step 3.3.2) may comprise: modelling x[n] as a sum of M superimposed components $a_m z_m^n$ plus a term d[n] representing white noise according to $$x[n] = d[n] + \sum_{m=1}^{M} a_m z_m^n, \text{ with } n \in [0, N-1], \quad (2')$$

wherein N is the number of measured training signal samples, n is a discrete time index corresponding to a measured training signal sample, m is an index denoting a weighted oscillation component $a_m z_m^n$ with m=[1, M], M is the number of weighted oscillation components admitted in the decomposition, and n, N, m, and M are integers. Herein, each superimposed component may be represented as a weighted oscillation component $a_m z_m^n$, wherein $z_m$ is a complex-valued oscillation function according to the predetermined decomposition scheme, $z_m^n := z_m[n]$ represents an oscillation function associated to $z_m$ and is namely the n-th value of the oscillation function corresponding to the discrete time index n, and $a_m$ is a complex-valued weight parameter.

In this other implementation, the complex-valued oscillatory parameter $z_m$ may be mapped to the oscillation function of the discrete time index n by $$z_m^n = (|z_m| e^{i \angle z_m})^n = |z_m|^n e^{i \angle z_m n}. \quad (3')$$

In this other implementation, a weighted oscillation component $a_m z_m^n$ may be given as a function of time by:

$$a_m z_m^n = a_m (|z_m| e^{i \angle z_m})^n = a_m |z_m|^n e^{i \angle z_m n} \quad (4')$$

Further in this other implementation, the linear frequency $f_m$ of the weighted oscillation component m and $\angle z_m$ are connected as follows:

$$\angle z_m = 2\pi \frac{f_m}{f_s}, \quad (5')$$

wherein $f_s$ denotes the sampling frequency.

In this other implementation, each weighted oscillation component $a_m z_m^n$ may be represented by a subset of characteristic parameters. This subset may comprise the absolute value of the weight parameter, i.e. $|a_m|$, the angle of the weight parameter, i.e. $\angle a_m$, the absolute value of the oscillatory parameter, $|z_m|$, the angle of the oscillatory parameter, i.e. $\angle z_m$. Herein, each subset of characteristic parameters can be summarized as a vector $\theta_m$:

$$\theta_m^T = [|a_m| \ \angle a_m \ |z_m| \ \angle z_m], \quad (6')$$

wherein $\bullet^T$ indicates a transposed vector, and
wherein a parameter matrix θ is defined in terms of the vectors $\theta_m$ as:

$$\Theta = [\theta_1 \ \theta_2 \ \ldots \ \theta_M], \quad (7')$$

such that the parameter matrix θ contains a complete set of characteristic parameters for all M superimposed components.

Further in this other implementation, the absolute value $|a_m|$ of a respective weight parameter may correspond to a scaling of the oscillatory component, the angle $\angle a_m$ of a respective weight parameter may correspond to a phase shift of the oscillatory component. Further, the absolute value $|z_m|$ of the oscillatory parameter may correspond to a damping of the oscillatory component, and the angle $\angle z_m$ of the oscillatory parameter may correspond to a frequency of the weighted oscillation component $a_m z_m^n$.

BRIEF DESCRIPTION OF THE DRAWINGS

In the following, exemplary embodiment examples of the present disclosure are described in detail with reference to the appended drawings, in which:

FIG. 2A and FIG. 2B illustrate, respectively, the real part and the imaginary part of a first superimposed component of a decomposition of an exemplary decay signal trace illustrated in FIGS. 2(e) and 2(f).

FIG. 2C and FIG. 2D illustrate, respectively, the real part and the imaginary part of a second superimposed component of a decomposition of the exemplary a decay signal trace illustrated in FIGS. 2(e) and 2(f).

FIG. 2E and FIG. 2F illustrate, respectively, the real part and the imaginary part of an exemplary a decay signal trace, which can be represented as a summation of the first superimposed component illustrated in FIGS. 2(a) and 2(b) and the second superimposed component illustrated in FIGS. 2(c) and 2(d).

FIG. 3A and FIG. 3B illustrate, respectively, the representation of a first exemplary complex-valued oscillatory parameter, having a first damping and a first frequency, in the complex plane and a representation of the associated first exemplary oscillation function as a function of the discrete time index.

FIG. 3C and FIG. 3D illustrate, respectively, the representation of a second exemplary complex-valued oscillatory parameter, having the first damping and a second frequency being the double of the first frequency, in the complex plane and a representation of the associated second exemplary oscillation function as a function of the discrete time index.

FIG. 3E and FIG. 3F illustrate, respectively, the representation of a third exemplary complex-valued oscillatory parameter, having a second damping being the half of the first damping and the second frequency being the double of the first frequency, in the complex plane and a representation of the associated third exemplary oscillation function as a function of the discrete time index.

FIG. 6, left diagram, illustrates the output of the analog-to-digital converter (ADC) in an I-channel, that is ADC I, of a received signal processing chain and its approximation by a decomposition of degree M=3.

FIG. 6, right diagram, illustrates the output of the analog-to-digital converter (ADC) in a Q-channel, that is ADC Q, of a received signal processing chain and its approximation by the decomposition of degree M=3.

FIG. 7A shows a triple of diagrams illustrating, respectively, the first oscillatory parameter $z_1$ of M=3 superimposed components as obtained from fitting decompositions of degree M to a plurality of measured and recorded training decay signal traces for a plurality of training unloaded RF fields (leftmost diagram), for a plurality of RF fields loaded with a training NFC tag (centre diagram), and for a plurality of RF fields loaded with a training metal object (rightmost diagram).

FIG. 7B shows a triple of diagrams illustrating, respectively, the second oscillatory parameter $z_2$ of M=3 superimposed components as obtained from fitting decompositions of degree M to the plurality of measured and recorded training decay signal traces for the plurality of training unloaded RF fields (leftmost diagram), for the plurality of RF fields loaded with a training NFC tag (centre diagram), and for the plurality of RF fields loaded with a training metal object (rightmost diagram).

FIG. 7C shows a triple of diagrams illustrating, respectively, the third oscillatory parameter $z_3$ of M=3 superimposed components as obtained from fitting decompositions of degree M to the plurality of measured and recorded training decay signal traces for the plurality of training unloaded RF fields (leftmost diagram), for the plurality of RF fields loaded with a training NFC tag (centre diagram), and for the plurality of RF fields loaded with a training metal object (rightmost diagram).

FIG. 8A shows respective pairs of diagrams illustrating, respectively, the absolute values of the first oscillatory parameter $z_1$ of the respective decompositions of degree M=3 and the angles of the first oscillatory parameter $z_1$ of the respective decompositions of degree M=3.

FIG. 8B shows respective pairs of diagrams illustrating, respectively, the absolute values of the second oscillatory parameter $z_2$ of the respective decompositions of degree M=3 and the angles of the second oscillatory parameter $z_2$ of the respective decompositions of degree M=3.

FIG. 8C shows respective pairs of diagrams illustrating, respectively, the absolute values of the third oscillatory parameter $z_3$ of the respective decompositions of degree M=3 and the angles of the third oscillatory parameter $z_3$ of the respective decompositions of degree M=3.

Figure 1:
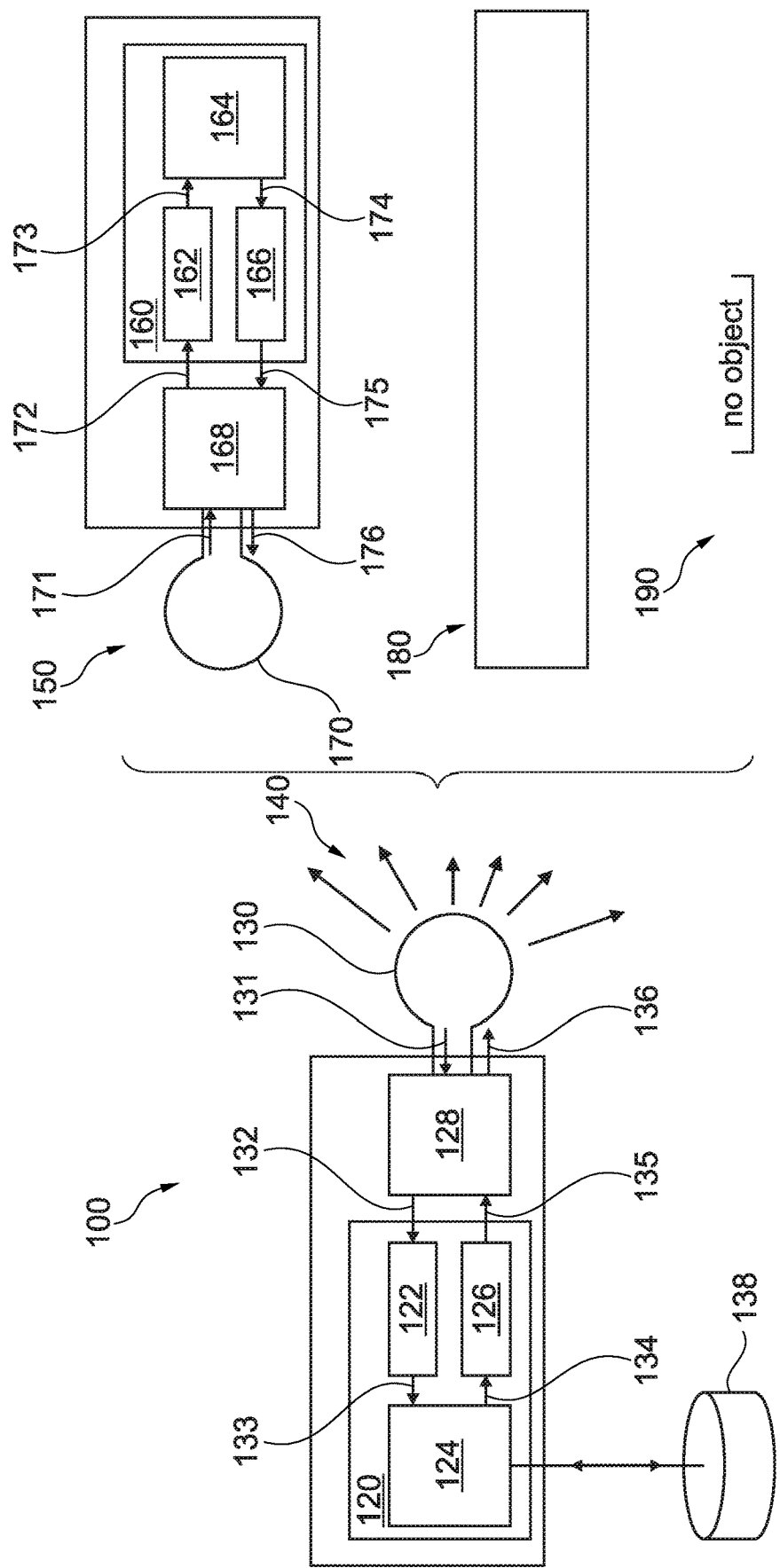
FIG. 1 shows an arrangement of an NFC reader device transmitting an RF field and alternative types of objects arranged in the transmitted RF field.

For reasons of conciseness, features, which will be described with respect a particular figure, may not be described again, if they appear likewise or similarly in another figure.

DETAILED DESCRIPTION

Before exemplary embodiment examples of the present disclosure are described with reference to the figures, some general aspects of the invention as proposed by the present inventors shall still be explained.

One of the standards for near field communication (NFC) is given in ISO/IEC14443-3: "Cards and security devices for personal identification—Contactless proximity objects—Part 3: Initialization and anticollision". ISO, Fourth edition, Geneva, Switzerland, 2018.

In the standard NFC scenario, the NFC reader periodically switches between two states: (i) standby and (ii) polling. During standby, the reader does not send. When polling, the reader sends a command to activate cards that may be located in its vicinity. The specific command is defined by the used communication standard (e.g. REQA or REQB for ISO/IEC 14443). Further, the duration of both standby and polling also needs to be chosen such that the timing requirements of this standard are fulfilled. The actual communication between a card and the reader is initiated by placing a card in the radio frequency (RF) field of the reader. Then, the card is powered and responds to the reader polling command (e.g. ATQA or ATQB for ISO/IEC 14443).

It is evident that in case of battery-powered reader devices, the current consumption caused by the polling mechanism is not negligible. Hence, so-called low power card detection (LPCD) approaches exist that aim to avoid the need to periodically poll for cards. The main idea behind LPCD is to avoid sending the polling command if no card is in the reader's RF field. Hence, before polling, the reader evaluates if a card is in its RF field. If a card is detected, the polling sequence is sent, if no card is detected, the reader does not need to poll and switches back to standby again. If the card detection mechanism consumes less current than sending the polling command, the overall current consumption is reduced compared to the standard scenario.

State-of the art LPCD approaches rely on analyzing the loading and detuning of the antenna by switching the RF field on and off. This is usually done as follows:

1) After a full polling cycle, the unmodulated RF field is switched on and the LPCD is calibrated by setting the analog chain (including HF attenuator, baseband attenuator, DC offset compensation) to its operating point.
2) After calibration, the reader field is switched on and off periodically. Since the operating point of the analog chain is fixed according to the initialization, a change at the input (relative to the previous measurements) is associated to a change in the loading conditions or detuning of the antenna. If this change exceeds a certain threshold value, the polling procedure is triggered. This event shall be called a wake-up in the following.

Typically, the steady-state behavior of the system is analyzed to decide whether it is necessary to poll or not. The main drawback of this procedure is that any object (e.g. any piece of metal or similar) that interacts with the RF field of the reader affects the loading conditions or detuning of the antenna. Hence, while state-of-the-art LPCD approaches can detect if objects are brought to or removed from the reader's field, they often cannot distinguish NFC tags from e.g. metal objects. This means that an approach that can distinguish NFC tags from non-relevant objects can help to further decrease the current consumption of a reader device.

The average current consumption of the reader can be modelled as follows:

$$I_{average} = \frac{I_{standby} \cdot t_{standby} + I_{on} \cdot t_{on}}{t_{standby} + t_{on}}, \quad (8)$$

where $I_{standby}$ represents the current consumption in standby or power down mode, $I_{on}$ is the current consumption during "normal" operation (e.g. polling), $t_{standby}$ is the duration of the phase where the reader is in power down, and $t_{on}$ is the duration of the phase where the reader either polls or performs LPCD.

To minimize current consumption, LPCD aims to minimize $t_{on}$ while ensuring reliable card detection. For further analysis of the LPCD mechanism, we can further subdivide the duration $t_{on}$ into two phases: $t_{on,\ LPCD}$, where the LPCD is performed, and $t_{on,\ poll}$, where a polling request is performed after a card has been detected.

$$I_{average} = \frac{I_{standby} \cdot t_{standby} + I_{on,LPCD} \cdot t_{on,LPCD} + I_{on,poll} \cdot t_{on,poll}}{t_{standby} + t_{on,LPCD} + t_{on,poll}}. \quad (9)$$

Clearly, wake-ups due to e.g. metal objects placed in the field, will increase $t_{on,\ poll}$ and the current consumption increases. A method that helps to only send, the polling request if a card is placed in the reader field hence would reduce the current consumption compared to the standard LPCD mechanism. This can be further illustrated by considering $t_{on,\ poll}$ as a result of the detection performance. As an extreme case, we consider the duration $\tilde{t}_{on,\ poll}$, representing the scenario where any load change will cause the reader to send a polling request. This time will be scaled by the probability of a wake-up P(wake-up) to obtain $t_{on,\ poll}$:

$$t_{on,poll} = P(\text{wake-up}) \cdot \tilde{t}_{on,poll}. \quad (10)$$

With the following probabilities:
P(wake-up|tag) the probability of a wake-up in case a card/tag entered the field,
P(wake-up|metal) the probability of a wake-up in case a non-relevant objects entered the field,
P(wake-up|unloaded) the probability of a wake-up in case the loading condition has not changed,
P(tag) the a priori probability of a card/tag entering the field, P(metal) the a priori probability of a metal object entering the field, and
P(unloaded) the a priori probability of measurement outliers that appear as a load change,
the total probability of a wake-up is given by:

$$P(\text{wake-up}) = \sum_{i=1}^{\#objects} P(\text{wake-up} \mid object_i) P(object_i) \quad (11)$$

In this consideration, with the setting P(unloaded)=0, one has:

$$P(\text{wake-up}) = \quad (12)$$

$$P(\text{wake-up} \mid \text{tag}) \cdot P(\text{tag}) + P(\text{wake-up} \mid \text{metal}) \cdot P(\text{metal})$$

Further, if it is assumed that a priori, no knowledge about the relative frequency of cards and metals entering the reader field is available, accordingly one sets P(tag)=P(metal)=½. This results in the final equation for the probability of a wake-up:

$$P(\text{wake-up}) = (P(\text{wake-up} \mid \text{tag}) + P(\text{wake-up} \mid \text{metal})) \cdot \tfrac{1}{2} \quad (13)$$

An optimal LPCD mechanism would detect any tag, i.e. P(wake-up|tag)=1, while it would never trigger a wake-up if a metal object is placed in the field, i.e. P(wake-up|metal)=0. However, the state-of-the-art is rather characterized by P(wake-up|metal)=1 meaning that P(wake-up)=1, and $t_{on,\,poll}=t_{on,\,poll}$ Equation (10) and Equation (13) illustrate that the duration $t_{on,\,poll}$, and hence the corresponding current consumption, can be reduced by reducing P(wake-up|metal).

According to the present disclosure, it is proposed to analyze the dynamic behavior of the overall system instead of its steady-state behavior. To this end, the decay curve after the reader's RF field is switched off is analyzed to gather further information about the types of objects that are currently affecting loading and tuning condition of the reader. The rationale behind this strategy is that NFC tags and cards can be considered as "tuned objects", which means that their antenna is tuned to a certain resonance frequency. This is what separates them from "untuned" objects, that do not exhibit a specific resonance frequency. While they may have similar (or at least non-distinguishable) effects on some parameters of the system, in line with the present disclosure, it is argued that resonance effects can be observed after the reader field has been switched off and that these effects can be used to separate the two categories of objects. It will further be shown that the proposed method may also be used to distinguish NFC tags from each other. Accordingly, the proposed mechanism can be used to enhance the performance of any other LPCD method.

Some key features of the present disclosure include:
Objects in the reader field can be classified to reduce current consumption.
Provided is a method to analyze the decay behavior of the NFC system.
The method involves approximating the decay behavior of the NFC system by a small number of complex-valued oscillations.
The method may also feature the possibility to distinguish between certain NFC tags in the reader field.

In what follows, the received signal after the RF field is switched off shall be denoted by x[n], where n denotes the discrete-time index. The problem formulation in discrete-time domain is without loss of generality, as the same observations and modelling assumptions may also be made in continuous-time. The signal x[n] is complex-valued. Its real part corresponds to the I-channel ADC output ($x_I[n]$) and its imaginary part to the Q-channel ADC output ($x_Q[n]$), respectively. The basis of the present disclosure is to perform a decomposition of x[n], namely to model x[n] as a sum of M superimposed components $x_m[n]$, in particular M damped (and/or weighted) complex-valued oscillation components $a_m z_m^n$, plus a white noise term d[n]:

$$x[n] = d[n] + \sum_{m=1}^{M} a_m z_m^n = d[n] + \sum_{m=1}^{M} x_m[n], \text{ with } n \in [0, N-1] \quad (1)$$

wherein N is number of observed samples, $a_m$ represents complex-valued weights (i.e. scaling and phase shifting) associated to component in, and $z_m$ is an oscillatory parameter that determines the time-domain shape of the signal. The angle of $z_m$ corresponds to the frequency and the absolute value of $z_m$ to the damping of the respective oscillation component.

In this decomposition, a superimposed component $x_m[n]=a_m z_m^n$ may be expressed as a weighted oscillation component $a_m z_m^n$, which given as a function of time by:

$$x_m[n] = a_m z_m^n = a_m \left( |z_m| e^{i \angle z_m} \right)^n = a_m |z_m|^n e^{i \angle z_m^n} \quad (3\text{''})$$

A complex-valued oscillatory parameter $z_m$ may be mapped to the oscillation function of the discrete time index n by $$z_m^n = \left( |z_m| e^{i \angle z_m} \right)^n = |z_m|^n e^{i \angle z_m^n}. \quad (4\text{''})$$

The linear frequency $f_m$ of oscillatory component in and $\angle z_m$ are connected as follows $$\angle z_m = 2\pi \frac{f_m}{f_s}, \quad (5\text{''})$$

wherein $f_s$ denotes the sampling frequency.

This concept of decomposition is illustrated in FIG. 2A-FIG. 2F, which shows exemplary oscillatory components $x_m[n]$ of x[n] for M=2 as well as its reconstruction from the individual components, as follows.

Figure 2A:
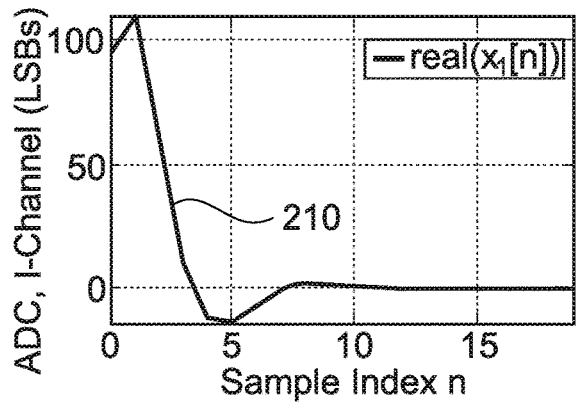
FIG. 2A-FIG. 2F shows respective pairs of diagrams, which illustrate a real part and an imaginary part of respective functions as follows.
Figure 2B:
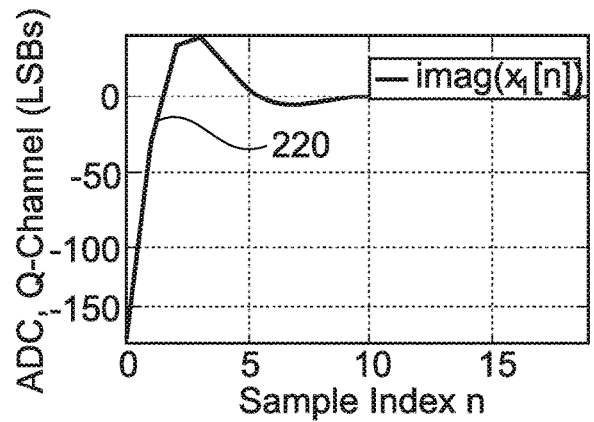
Figure 2C:
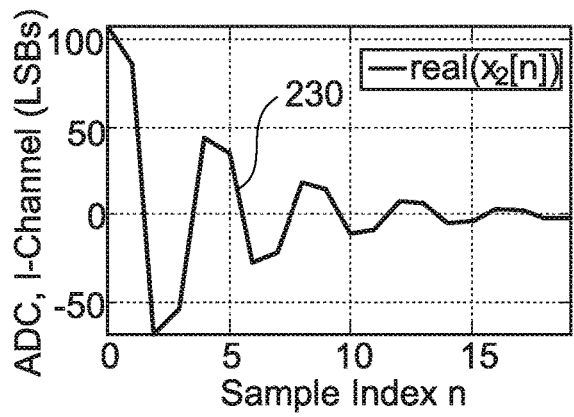
Figure 2D:
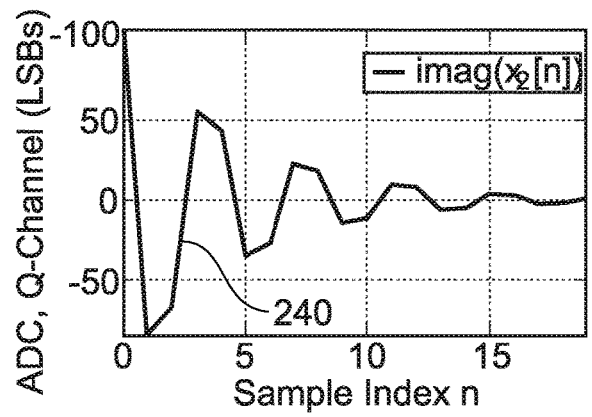
Figure 2E:
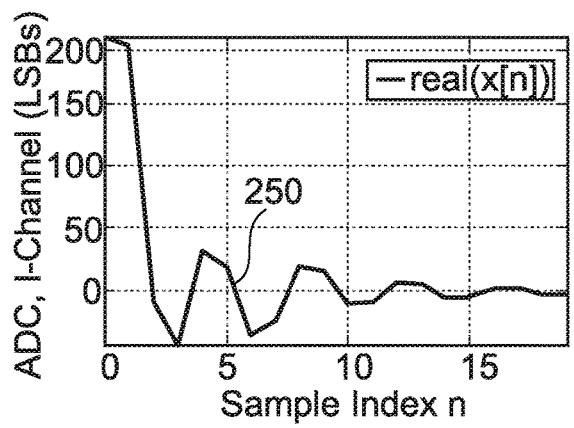
Figure 2F:
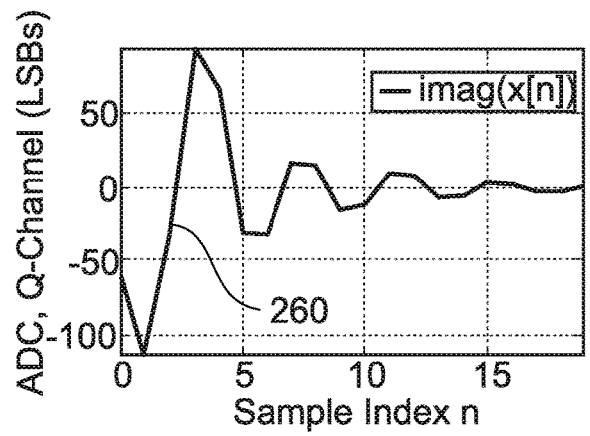

FIG. 2A-FIG. 2F shows respective pairs of diagrams, each pair illustrating a real part and an imaginary part of respective functions as follows. FIG. 2A and FIG. 2B illustrate, respectively, the real part 210 and the imaginary part 220 of a first superimposed component $x_1[n]=a_1 z_1^n$ of a decomposition of an exemplary decay signal trace illustrated in FIG. 2E and FIG. 2F. FIG. 2C and FIG. 2D illustrate, respectively, the real part 230 and the imaginary part 240 of a second superimposed component $x_2[n]=a_2 z_2^n$ of a decomposition of the exemplary a decay signal trace illustrated in FIG. 2E and FIG. 2F. FIG. 2E and FIG. 2F illustrate, respectively, the real part 250 and the imaginary part 260 of the exemplary a decay signal trace x[n], which is represented as a summation of the first superimposed component 210, 220, viz. $x_1[n]$ illustrated in FIG. 2A and FIG. 2B and the second superimposed component 230, 240, viz. $x_2[n]$ illustrated in FIG. 2C and FIG. 2D.

The decay signal trace 250, 250 illustrated in FIG. 2E and FIG. 2F is an exemplary decay signal trace in that it represents a synthetically generated signal trace, which however approximates a decay signal trace that has been measured for an NFC tag in the RF field of an NFC reader device in an experimental set up. The decomposition into the first and second superimposed components has been obtained for the following set of characteristic parameters:

| $a_1$ | $a_2$ | $z_1$ | $z_2$ |
|---|---|---|---|
| 150 $e^{i\pi/4}$ | 190 $e^{-i\pi/3}$ | 0.8 $e^{-i\pi/2}$ | 0.6 $e^{i\pi/4}$ |

Further according to the concept of decomposition according to the present disclosure, each superimposed component $x_m[n]$ can, as an alternative to its time-domain form, be represented by a set of characteristic parameters, derived from associated weighted oscillation components $a_m z_m^n$, stacked into the vector $\theta_m$:

$$\theta_m^T = [\,|a_m|\ \ \angle a_m\ \ |z_m|\ \ \angle z_m\,], \qquad (6")$$

where $\cdot^T$ indicates a transposed vector. Furthermore, a parameter matrix is defined:

$$\Theta = [\,\theta_1\ \ \theta_2\ \ \ldots\ \ \theta_M\,] \qquad (7")$$

which contains all characteristic parameters of the superimposed components. The impact of $z_m$ on $x_m[n]$ is illustrated in FIG. 3A-FIG. 3F, as follows.

Figure 3A:
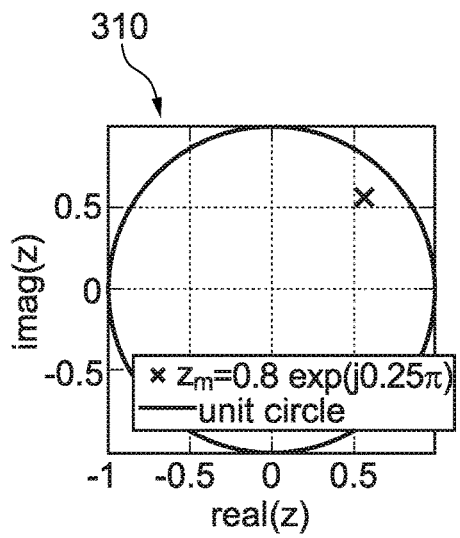
FIG. 3A-FIG. 3F shows respective pairs of diagrams, which illustrate a representation of a complex-valued oscillatory parameter in the complex plane and a representation of the associated oscillation function as a function of the discrete time index, as follows.
Figure 3B:
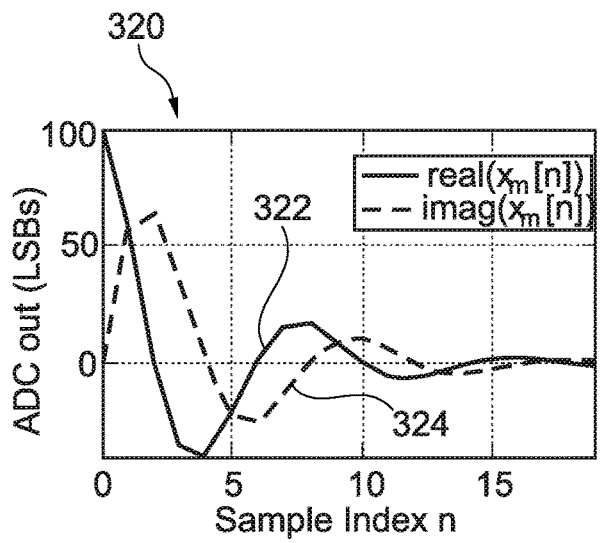
Figure 3C:
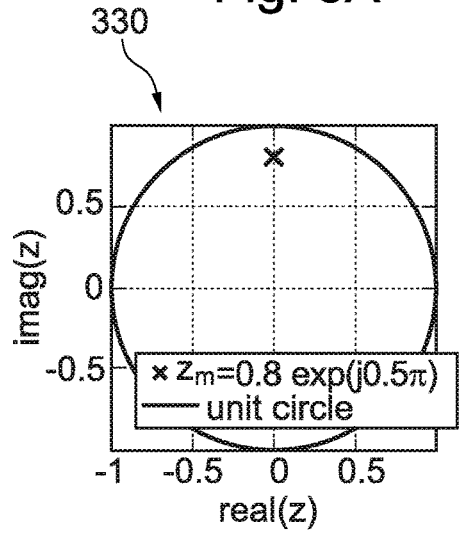
Figure 3D:
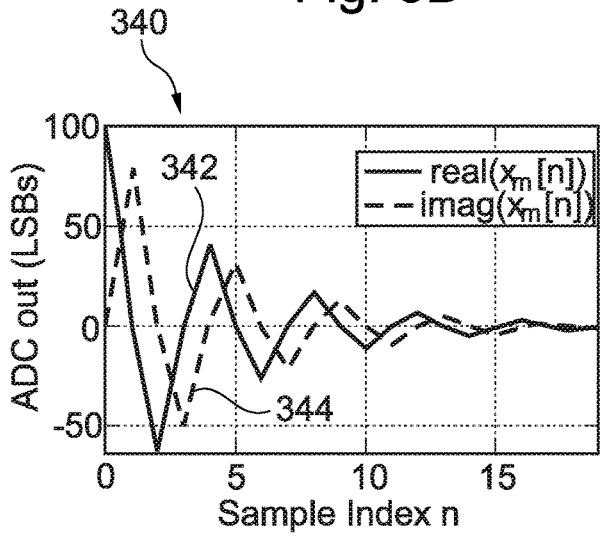
Figure 3E:
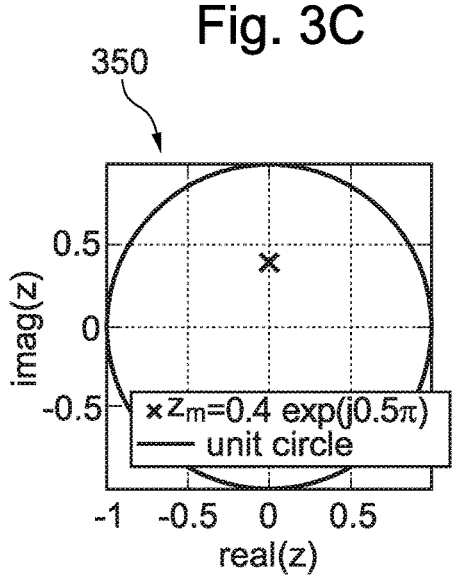
Figure 3F:
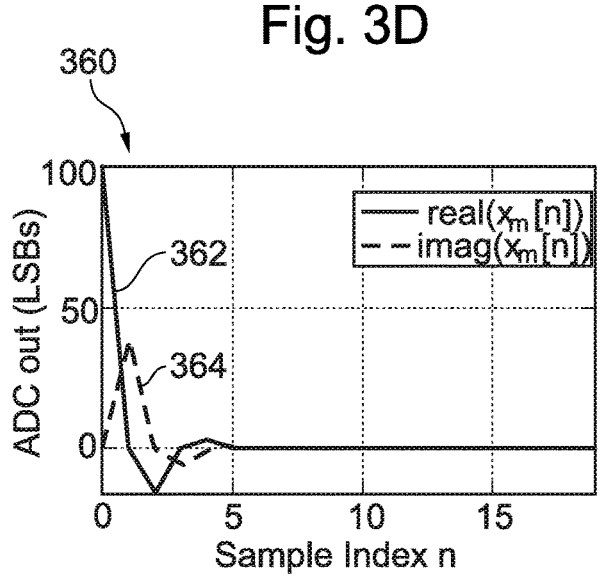

FIG. 3A-FIG. 3F shows respective pairs of diagrams, each pair illustrating a representation of a complex-valued oscillatory parameter in the complex plane and a representation of the associated oscillation function as a function of the discrete time index. In particular, FIG. 3A illustrates the representation 310 of a first exemplary complex-valued oscillatory parameter $z_1$, which can be expressed according to Equation (4") as $z_1=(|z_1|e^{i\angle z_1})$, having a first damping $|z_1|$ and a first frequency $\angle z_1$, in the complex plane, for the first value for n=1 of the oscillation function. FIG. 3B illustrates a representation 320 of the associated first exemplary oscillation function, which has a real part 322 and an imaginary part 324, as a function of the discrete time index n. FIG. 3C illustrates the representation 330 of a second exemplary complex-valued oscillatory parameter $z_2$, which can be expressed according to Equation (4") as $z_2=(|z_2|e^{e\angle z_2})$, having a second damping $|z_2|=|z_1|$, which equals the first damping, and a second frequency $\angle z_2=2\angle z_1$, which is the double of the first frequency, in the complex plane, for the first value for n=1 of the oscillation function. FIG. 3D illustrates a representation 340 of the associated second exemplary oscillation function, which has a real part 342 and an imaginary part 344, as a function of the discrete time index n. FIG. 3E illustrates the representation 350 of a third exemplary complex-valued oscillatory parameter $z_3$, which can be expressed according to Equation (4") as $z_3=(|z_3|e^{i\angle z_3})$, having a third damping $|z_3|=1/2|z_1|$, which is the half of the first damping, and the third frequency $\angle z_3=2\angle z_1$, which is the double of the first frequency, in the complex plane, for the first value for n=1 of the oscillation function. FIG. 3F illustrates a representation 360 of the associated third exemplary oscillation function, which has a real part 362 and an imaginary part 364, as a function of the discrete time index n.

In summary, the characteristic parameter settings of the oscillatory parameters $z_1$, $z_2$, and $z_3$ illustrated in FIG. 3A-FIG. 3F are the following:

| a | $z_1$ | $z_2$ | $z_3$ |
|---|---|---|---|
| 100 | 0.8 $e^{i\pi/4}$ | 0.8 $e^{i\pi/2}$ | 0.4 $e^{i\pi/2}$ |

Decaying oscillations are characterized by a damping $|z_m|<1$. As is illustrated in the complex-plane representations 310, 330 and 350 of FIG. 3A-FIG. 3F, the closer an oscillatory parameter $z_m$ is to the unit circle, the smaller the damping is, and the longer the decay time is. Reversely, the further an oscillatory parameter $z_m$ is from the unit circle and the closer to its centre, the stronger the damping is, and the shorter the decay time is.

The frequency of an oscillation is characterized by the angle of $z_m$, i.e. $\angle z_m$. As is illustrated in the complex-plane representations 310, 330 and 350 of FIG. 3A-FIG. 3F, the greater the frequency of an associated oscillation function (see the respective representations 320, 340, 360), the greater the angle $\angle z_m$ of the oscillatory parameter $z_m$ is relative to, for example, the real axis of the complex-plane representation 310, 330, 350.

Further according to the present disclosure, it is considered that scaling, phase, damping, and frequency of oscillation functions that are observed after the RF field is switched off will be characteristic for certain objects. Hence, the method proposed according to the present disclosure attempts and may succeed to classify objects in the reader field based on $\theta$.

Following this line of thinking, the method for determining a type of object in an RF field of an NFC reader device proposed according to the first aspect of the present disclosure can be subdivided into the following main steps:

1. After the reader field is switched off, record N samples of ADC data.
2. Estimate $\theta$ from N observed signal samples of $x[n]$
3. Based on the estimate $\hat{\theta}$, classify any object in the reader field. (In this document, the symbol indicates the estimate.)

For each of steps 2 and 3, a plurality of implementations are known.

Regarding step 2, a non-exhaustive list of possibilities to estimate the oscillatory parameters includes
Prony's method,
pencil-of-function methods, and
(total) least squares estimators.

For a description of Prony's method, reference is made to Fernández Rodriguez, A. &.-G.-J. (2018): "Coding Prony's method in MATLAB and applying it to biomedical signal filtering. *BMC Bioinformatics*".

For a description of pencil-of-function methods, reference is made to Y. Hua, T. S. (1990): "Matrix pencil method for estimating parameters of exponentially damped/undamped sinusoids in noise". *IEEE Trans. Acoust. Speech Signal Process*.

For a description of (total) least squares estimator methods, reference is made to S W., C. (2000): "A two-stage discrimination of cardiac arrhythmias using a total least squares-based Prony modeling algorithm". *IEEE Trans*

*Biomed Eng*; and to Markovsky I, V. H. (2007): "Overview of total least-squares methods". *Signal Processing*.

Regarding step 3, a non-exhaustive list of possibilities to as to how a classification can be performed includes:
Bayesian classifiers,
support vector machines, and
artificial neural networks.

For a description of Bayesian classifier methods, reference is made to Devroye, L.; Gyorfi, L. & Lugosi, G. (1996): "A probabilistic theory of pattern recognition". *Springer*.

For a description of support vector machines methods, reference is made to Christopher Bishop (2006): "Pattern Recognition and Machine Learning". *Springer*.

For a description of artificial neural networks methods, reference is made to Schmidhuber, J. (2015): "Deep Learning in Neural Networks: An Overview". *Neural Networks*, vol 61: p. 85-117.

For implementation purposes, it may be necessary and is therefore recommended to reduce the computational complexity of the oscillatory parameter acquisition according to steps 2 and 3. An optimization of the approximation algorithms is one possible way to simplify this step. However, determination of other parameters that reflect the same quantities (or characteristic parameters) as $\theta_m$ may be another option; such parameters may include the zero-crossing rate after RF off, the decay time, the sample variance etc.

According to a second aspect of the present disclosure, it is conceived that training sets of the quantities (characteristic parameters) as $\theta_m$ are acquired during a training phase for a particular NFC reader device for each type of object, for which a classification shall be enabled.

In the following, a formal, generalized description of the method for determining a type of object in an RF field of an NFC reader device proposed according to the first aspect of the present disclosure is given with reference to FIG. 4. Then, a formal description of the method for acquiring a set of training data set for an NFC reader device for a plurality of training objects, from enabled training types of objects, in an RF field of the NFC reader device proposed according to the second aspect of the present disclosure is given with reference to FIG. 5.

Figure 4:
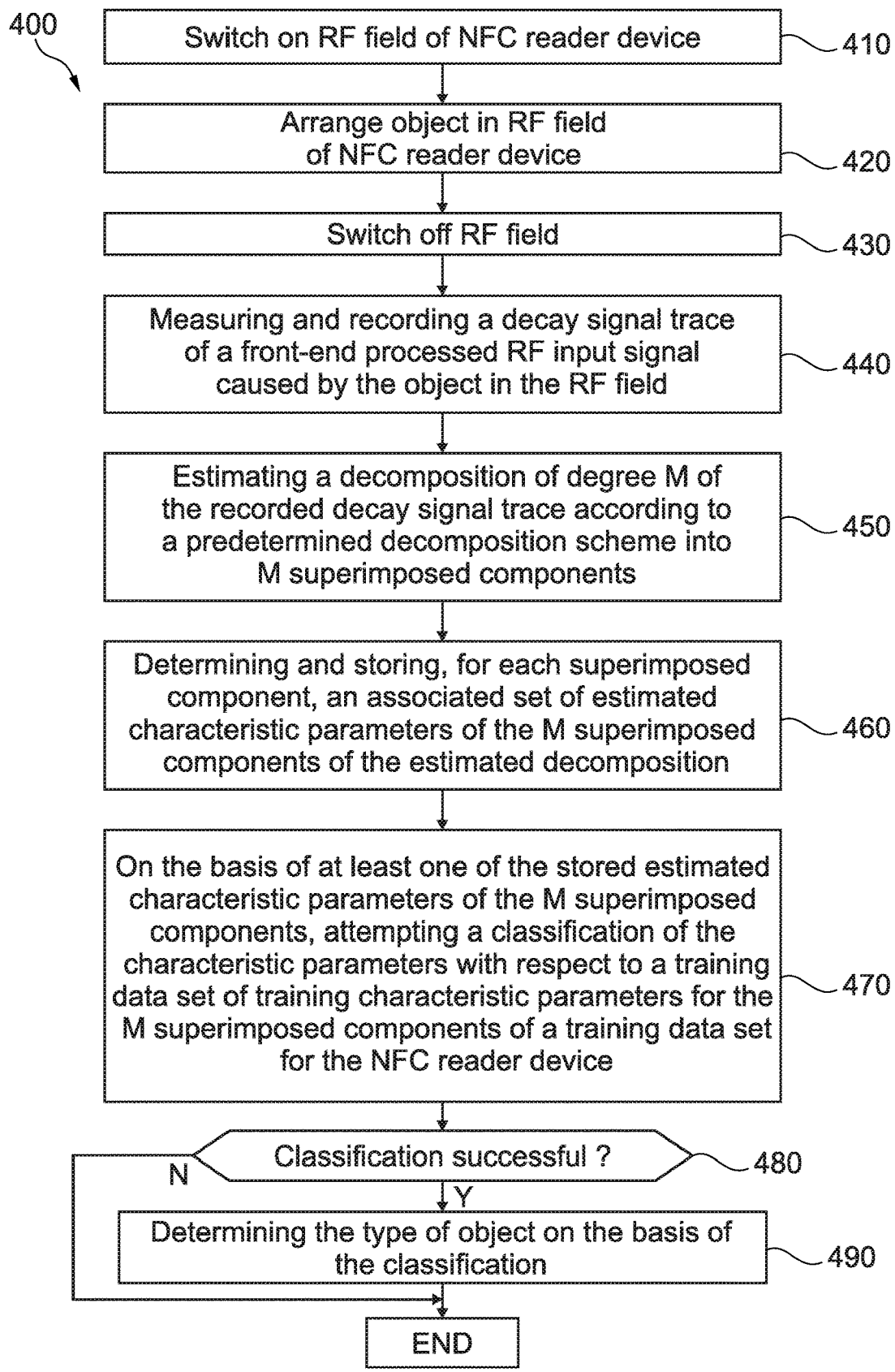
FIG. 4 shows a flow diagram of a method for determining a type of object arranged in an RF field transmitted by an NFC reader device, according to an embodiment of a first aspect of the present invention.

FIG. 4 shows a flow diagram of a method 400 for determining a type of object 150, 180, 190 arranged in an RF field 140 transmitted by an NFC reader device 100, according to an embodiment of a first aspect of the present disclosure. The type of object 150, 180, 190 is from a predetermined group of types of objects. The group of types of objects comprises at least one of an NFC tag 150, a metal object 180 and a no loading 190 with any object, see FIG. 1.

The method 400 starts, at step 410, with a switching on of the RF field 140 of an NFC reader device 100, and continues, at step 420, with an arranging an object 150, 180 in the RF field 140 of NFC reader device 100. The NFC reader device 100 may be an NFC enabled reader device, and may be a battery-powered device. Then, at step 430, the RF field 140 is switched off.

Figure 6A:
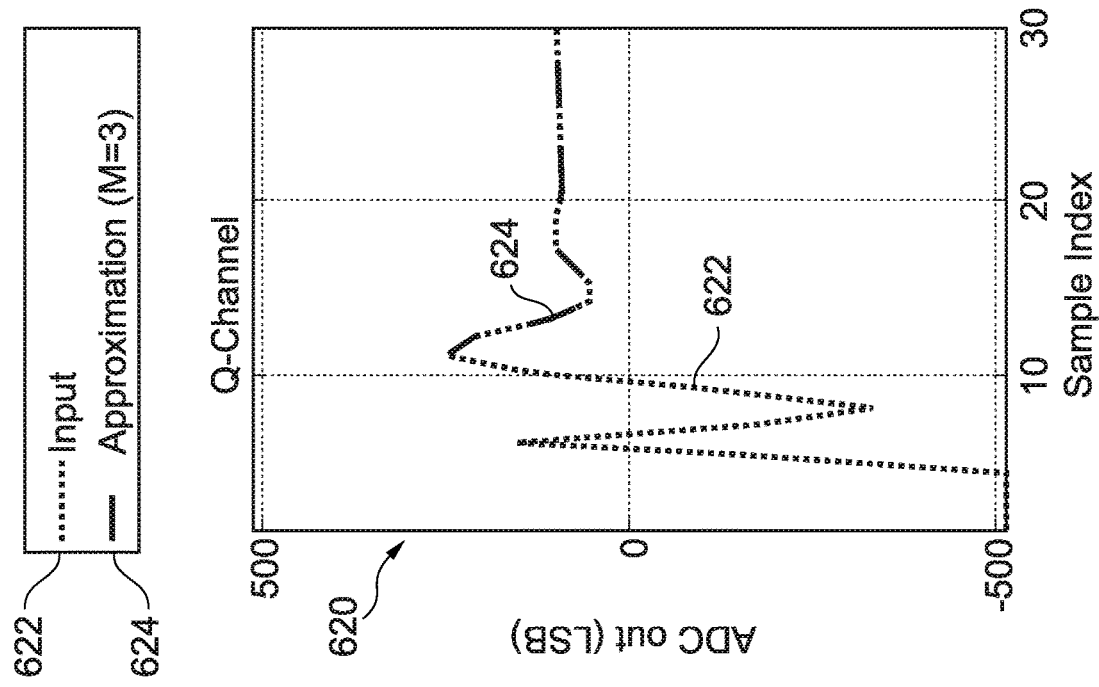
FIG. 6 shows a pair of diagrams illustrating, respectively, the output of a front-end processed, decay signal trace having N=30 sample values, and its approximation by decomposition of degree M=3 according to an embodiment of the present invention, as follows.
Figure 6B:
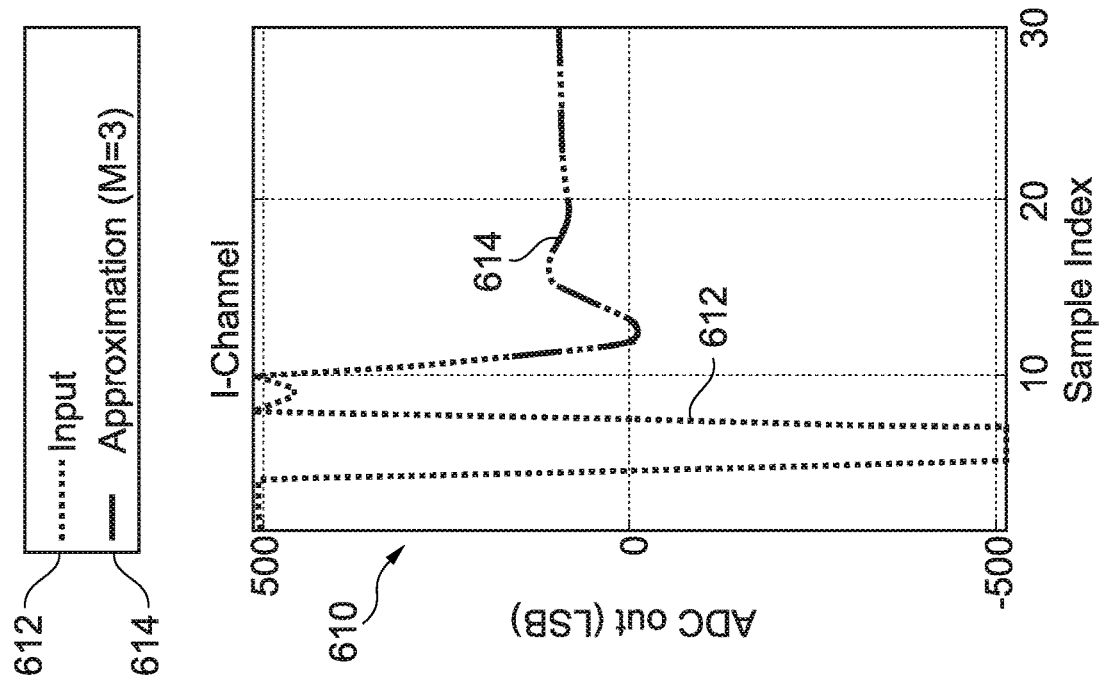

After the switching off 230 of the transmitted RF field 140, the method continues, at step 440, with measuring and recording a decay signal trace, for example a signal trace such as the traces 250 and 260 shown in FIG. 2E and FIG. 2F, or the decay signal traces 612 and 622 shown in FIG. 6, of a front-end processed RF input signal 131 caused by the object 150, 180 in the RF field 140 of the NFC reader device 100.

Then, the method continues, at step 450, with estimating a decomposition of a degree M according to a predetermined decomposition scheme, of the recorded decay signal trace, see traces 250 and 260 in FIG. 2E and FIG. 2F, and traces 612 and 622 in FIG. 6, caused by said object 150, 180 into M superimposed components, see for example the oscillatory components 210, 220, 230, 240 shown in FIG. 2A, FIG. 2B, FIG. 2C, and FIG. 2D, of the decomposition scheme. The method then continues, at step 460, with determining and storing, for each superimposed component, an associated set of estimated characteristic parameters, for example the parameters $\theta_m$ for m=1, 2, ... M, of the M superimposed components of the estimated decomposition of the recorded decay signal trace, see the traces 250 and 260 shown in FIG. 2E and FIG. 2F, or the decay signal traces 612 and 622 shown in FIG. 6. It is noted that, according to the decomposition, each one of said M superimposed components, see for example the oscillatory components 210, 220, 230, 240 shown in FIG. 2A, FIG. 2B, FIG. 2C, and FIG. 2D, of the decomposition scheme, is defined by a predetermined superimposition function and an associated set of characteristic parameters.

Figure 7A:
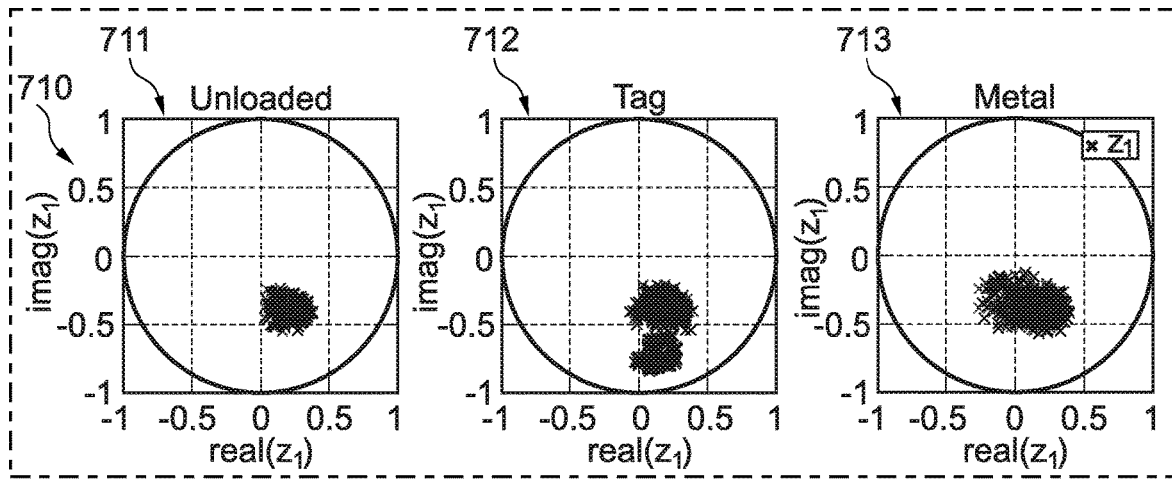
FIG. 7A-FIG. 7C shows respective triples of diagrams illustrating, respectively, oscillatory parameters of a decomposition of a degree M=3 fitted to respective pluralities of measured and recorded decay signal traces for a plurality of unloaded RF fields, for a plurality of RF fields loaded with an NFC tag, and for a plurality of RF fields loaded with a metal object, using the pencil of function method as follows.
Figure 7B:
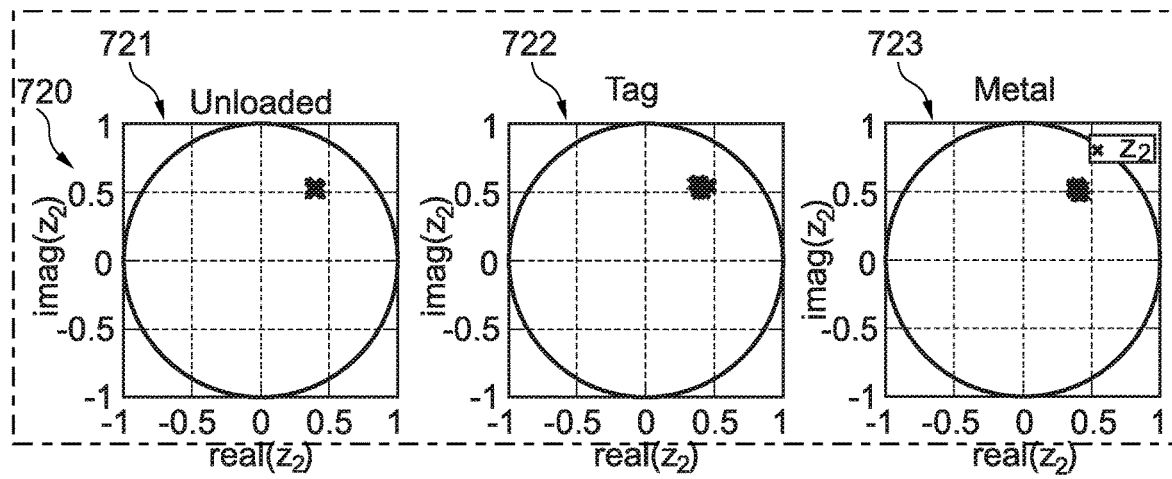
Figure 7C:
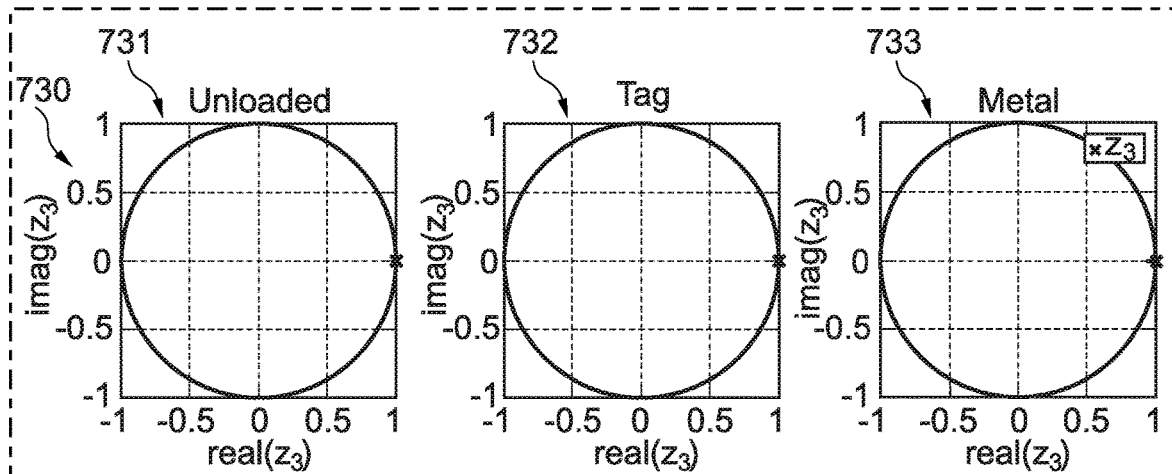
Figure 8A:
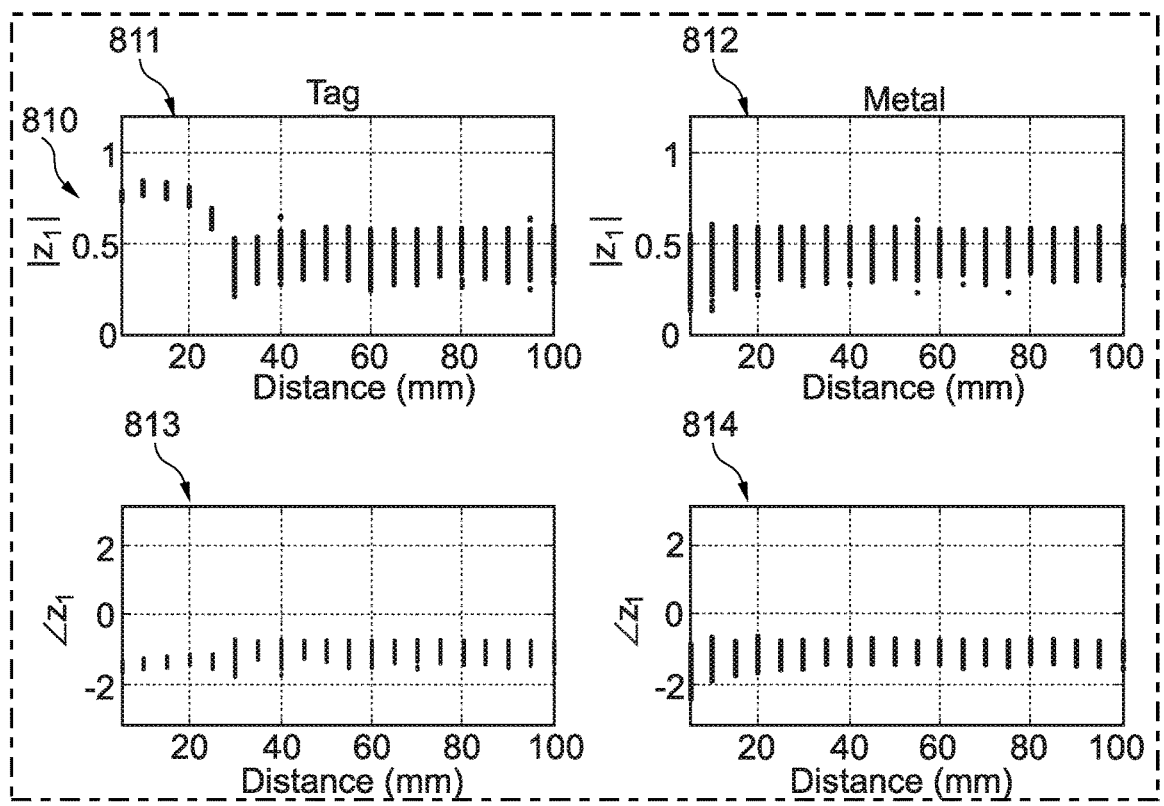
FIG. 8A-FIG. 8C shows respective pairs of diagrams illustrating, respectively, the absolute values of the first to third oscillatory parameters of respective decompositions of a degree M=3 and the angles of the first to third oscillatory parameters of the respective decompositions of degree M=3 fitted to respective pluralities of measured and recorded decay signal traces for a plurality of RF fields loaded with an NFC tag as a function of the distance of the NFC tag to the antenna of the NFC reader device, and for a plurality of RF fields loaded with a metal object as a function of the distance of the NFC tag to the antenna of the NFC reader device, as follows.
Figure 8B:
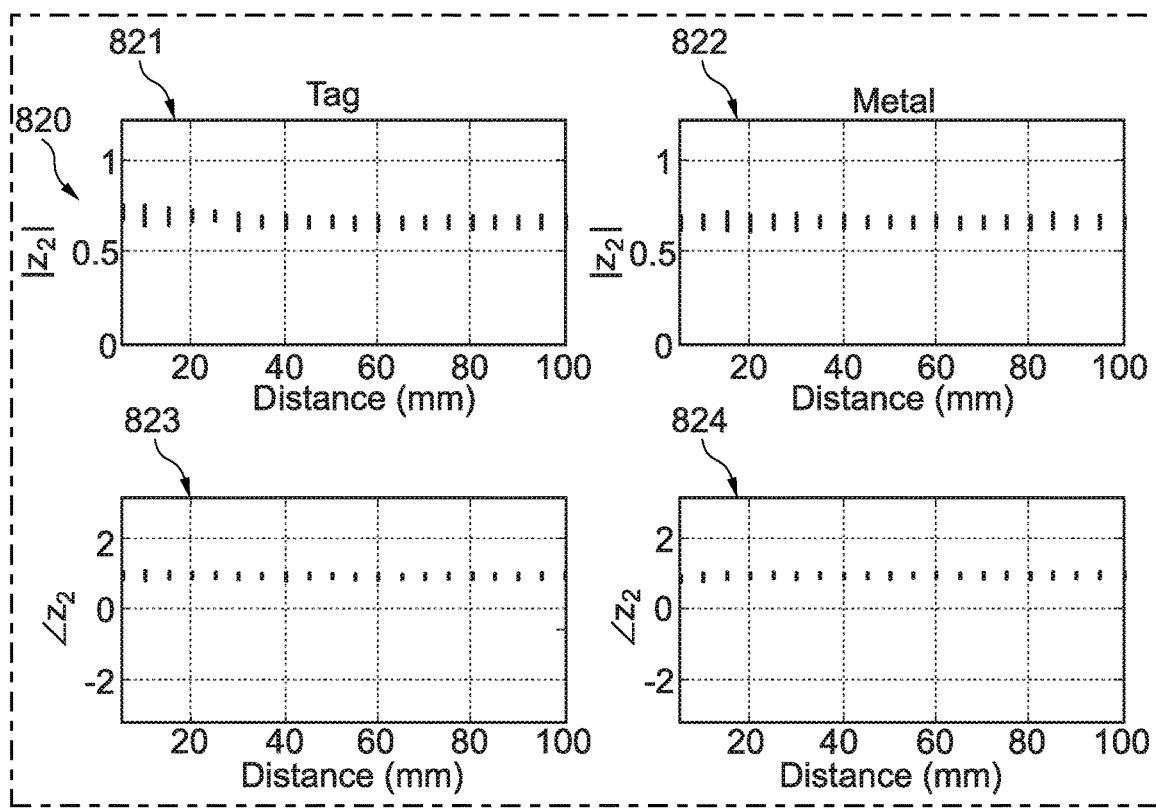
Figure 8C:
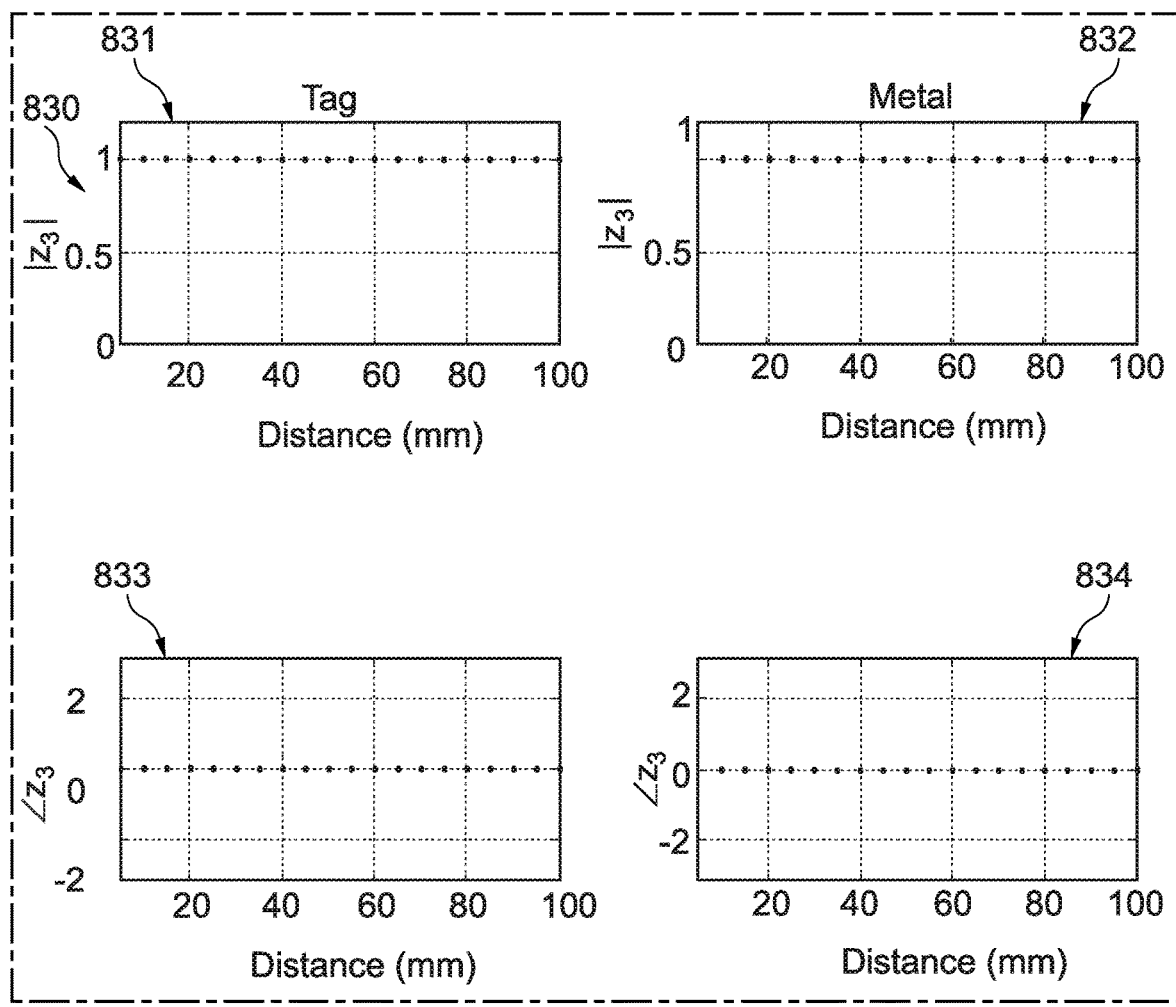
Figure 10:
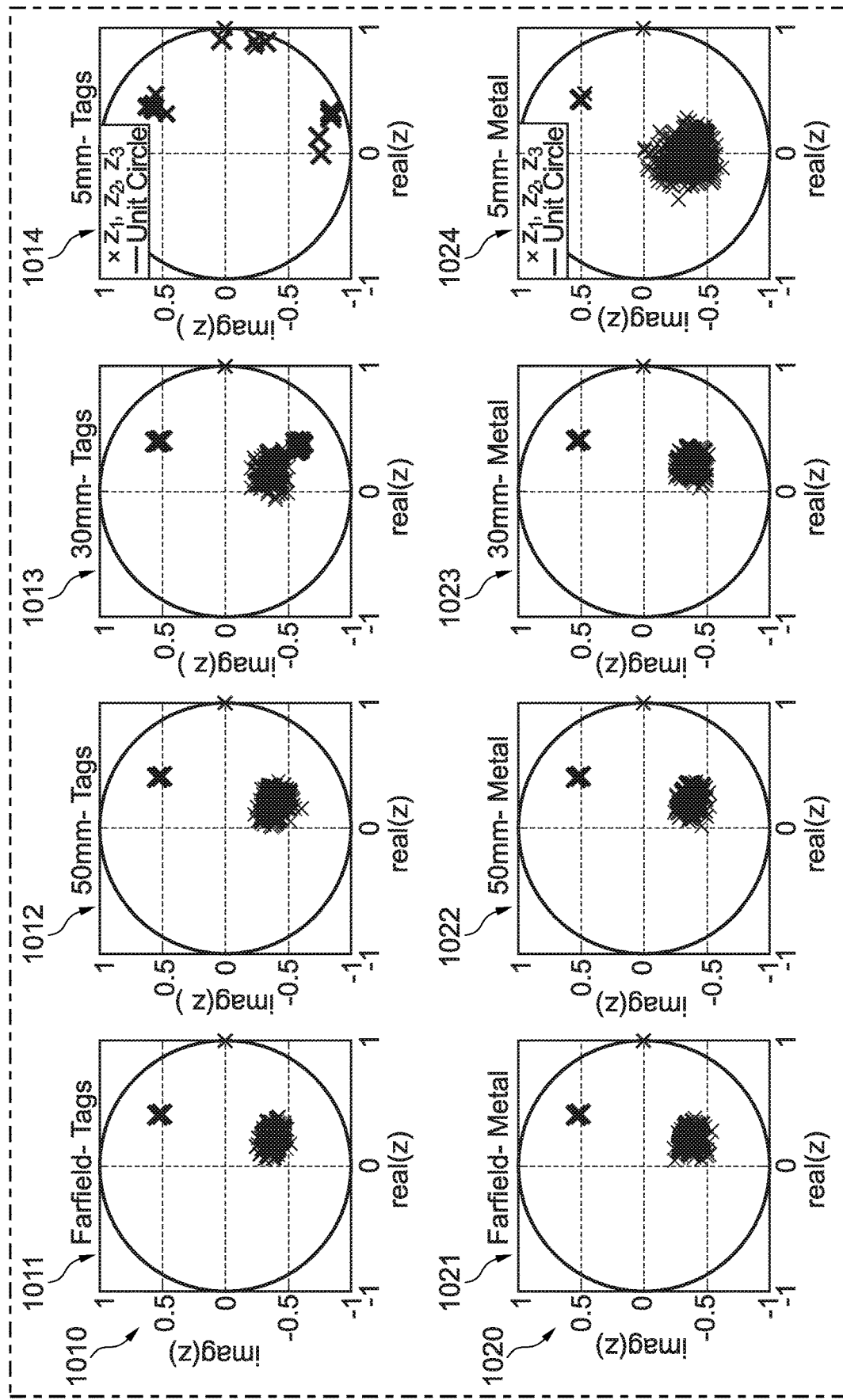
FIG. 10 shows respective sets of complex plane diagrams for a plurality of training NFC tags and for a plurality of training metal objects, the first set showing respective pluralities of oscillatory parameters $z_1$, $z_2$, $z_3$ for respective decompositions of training decay signal traces for a plurality of training tags arranged in an RF field of an NFC reader device at four different distances (farfield, 50 mm, 30 mm, and 5 mm), and the second set showing respective pluralities of oscillatory parameters $z_1$, $z_2$, $z_3$ for respective decompositions of training decay signal traces for a plurality of training metal objects arranged in an RF field of an NFC reader device at four different distances (farfield, 50 mm, 30 mm, and 5 mm).

Once the estimated decomposition has been accomplished, at 450, and the estimated characteristic parameters have been stored, at 460, the method proceeds to step 470, which consists of: on the basis of at least one of the stored estimated characteristic parameters of the M superimposed components according to the decomposition scheme, attempting a classification of said at least one of the characteristic parameters with respect to a training data set, see the data sets 710, 720, 730 in FIG. 7A-FIG. 7C, the data sets 810, 820, 830 in FIG. 8A-FIG. 8C, and the data sets 1010, 1020 in FIG. 10, of training characteristic parameters for the M superimposed components. The training data set, such as the data sets 710, 720, 730 in FIG. 7, the data sets 810, 820, 830 in FIG. 8A-FIG. 8C, and the data sets 1010, 1020 in FIG. 10, is stored in a database 138 that is accessible to the P&E unit 124 of NFC reader device 100, and has been obtained during a training phase, refer to the method 500 for the NFC reader device 100 shown in FIG. 5, using a plurality of training objects 150, 180, 190 from each type of object in the predetermined group of types of objects.

Then, at step 480, it is checked whether the attempted classification is successful. If not, see 480, No, the method proceeds to end. If the attempted classification has been successful, see 480, Yes, the method proceeds to step 490, which involves determining the type of object 150, 180), for which the decay signal trace has been recorded in step 440, on the basis of the successful classification, and then proceeds to end.

Figure 5:
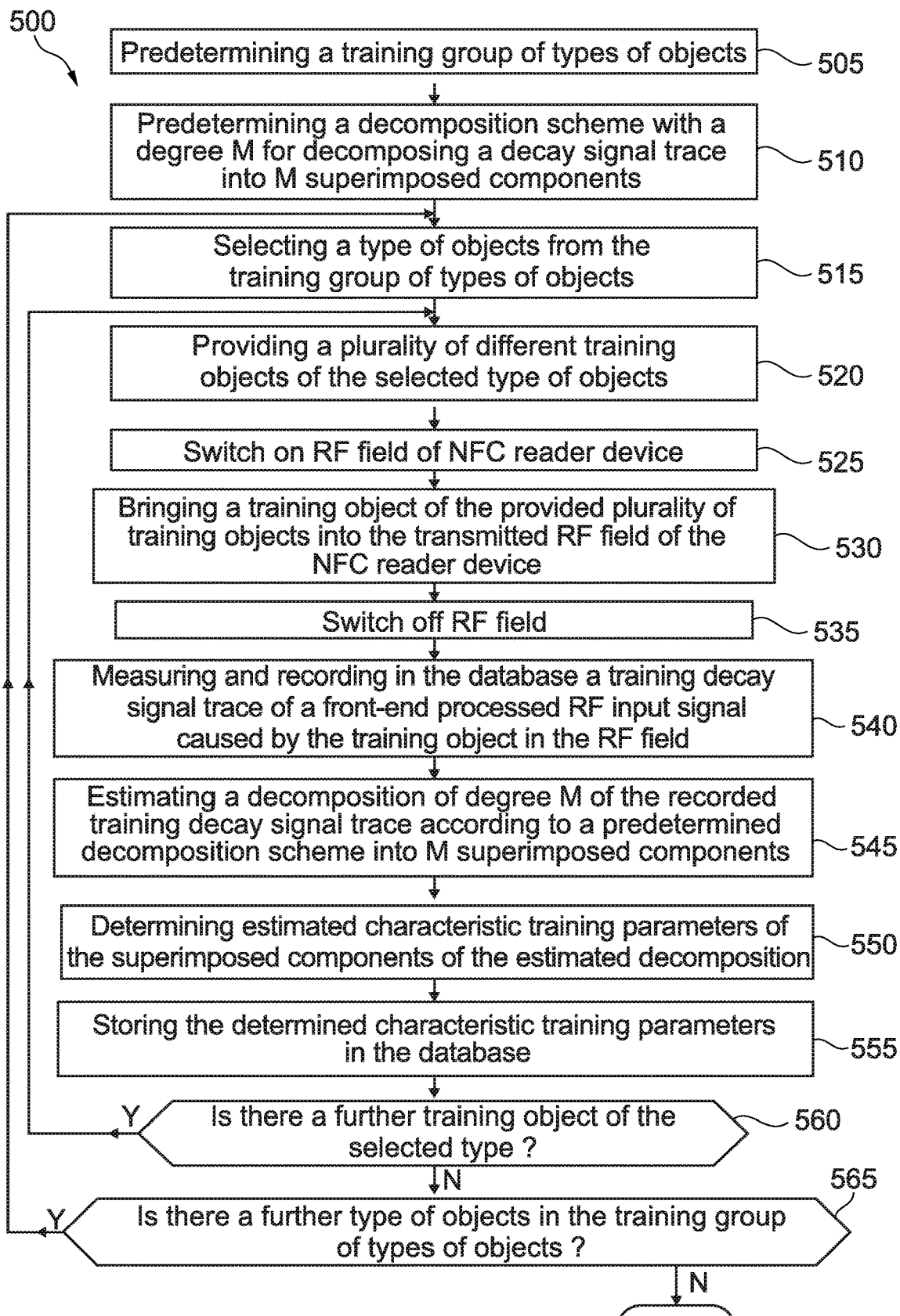
FIG. 5 shows a flow diagram of a method for acquiring a set of training data for an NFC reader device for a plurality of training objects from a training group of objects, according to an embodiment of a second aspect of the present invention.

FIG. 5 shows a flow diagram of a method 500 for acquiring a set of training data for an NFC reader device 100 for a plurality of training objects 150, 180, 190 from a training group of objects, according to an embodiment of a second aspect of the present disclosure.

The method 500 starts, at step 505, with predetermining a training group of types of objects 150, 180, 190. The training group of types of objects comprises at least one of an NFC tag 150, a metal object 180 and a no loading 190 with any object, see FIG. 1.

The method 500 proceeds to step 510, which consists of predetermining a decomposition scheme with a degree M for decomposing a decay signal trace, see traces 250 and 260 in FIG. 2E and FIG. 2F, and traces 612 and 622 in FIG. 6, into M superimposed components, see for example the oscillatory components 210, 220, 230, 240 shown in FIG. 2A, FIG. 2B, FIG. 2C, and FIG. 2D. It is noted that each one of said M superimposed components 210, 220, 230, 240 is defined by a predetermined superimposition function, which in turn is determined by an associated set of characteristic parameters. Step 510 may further involve storing, in particular a database 138 that is accessible for the P&E unit 124 of the NFC reader device 100, an indication of the decomposition scheme and the M predetermined superimposition functions.

The method 500 then performs the following steps 515 to 560 for each predetermined type of objects.

In doing so, the method proceeds to step 515, which involves selecting a type of objects from the training group of types of objects. The method 500 then proceeds to step 520, which involves providing 520 a plurality of different training objects, 150, 180, 190 in FIG. 1, of said predetermined type of objects, and in particular providing, sequentially, a first, second, etc. training object of a predetermined type.

The method 500 then proceeds to step 525, involving a switching on of the RF field 140 of an NFC reader device 100, and continues to step 530, consisting of arranging a training object 150, 180 in the RF field 140 of NFC reader device 100. The NFC reader device 100 may be an NFC enabled reader device, and may be a battery-powered device. Then, at step 535, the RF field 140 is switched off.

After the switching off 535 of the transmitted RF field 140, the method continues, at step 540, with measuring and recording a training decay signal trace, for example a signal trace such as the traces 250 and 260 shown in FIG. 2E and FIG. 2F, or the decay signal traces 612 and 622 shown in FIG. 6, of a front-end processed RF input signal 131 caused by the training object 150, 180 in the RF field 140 of the NFC reader device 100.

Then, the method continues to step 545, which involves estimating a decomposition of a degree M according to a predetermined decomposition scheme, of the recorded training decay signal trace, such as the traces 250 and 260 in FIG. 2E and FIG. 2F, and the traces 612 and 622 in FIG. 6, caused by said object 150, 180 into M superimposed components, see for example the superimposed components 210, 220, 230, 240 shown in FIG. 2A, FIG. 2B, FIG. 2C, and FIG. 2D, of the decomposition scheme. It is noted that, according to the decomposition, each one of said M superimposed components, see for example the superimposed components 210, 220, 230, 240 shown in FIG. 2A, FIG. 2B, FIG. 2C, and FIG. 2D, of the decomposition scheme, is defined by a predetermined superimposition function, which in turn is determined by an associated set of characteristic parameters. The method then continues to step 550, which involves determining, for each superimposed component, the associated set of estimated characteristic training parameters, for example the parameters $\theta_m$ for m=1, 2, . . . M, of the superimposed component of the estimated decomposition of the recorded training decay signal trace, see the traces 250 and 260 shown in FIG. 2E and FIG. 2F, or the decay signal traces 612 and 622 shown in FIG. 6. The method further continues to step 555, which involves storing, for each superimposed component, in the database 138 the determined associated set of estimated characteristic training parameters.

The method then proceeds to step 560, which involves checking whether there is a further training object of the selected type. If this is the case, at 560, Yes, the method returns to step 520. If no training object of the selected type is left, which means that a training decay signal trace has been recorded and processed for all training objects of the selected type, at 560, No, the method proceeds to step 565.

At step 565, it is checked whether there is a further type of objects of the training group of types of objects. If this is the case, at 565, Yes, the method returns to step 515. If there is no further type of training object left, which means that training decay signal traces have been recorded and processed for training objects of all the selected types, at 565, No, the method proceeds to end.

The methods 400 and 500 can be performed in an NFC reader device 100. To this end, the NFC reader device 100 comprises a processing and evaluation (P&E) unit 124, and further comprises a database 138, which is accessible for the P&E unit 124. The P&E unit 124 is capable to record and store the decay signal trace (250, 260; 612, 622) that is measured after the RF field is switched off. The P&E unit 124 is further capable to perform the methods 400 and 500. The database 138 is capable to store the training data set 710, 720, 730; 810, 820, 830; 1010, 1020 that has been obtained during a training phase for the NFC reader device 100 according to the method 500. In particular, the database 138 is capable to store the indication of the decomposition scheme and the M predetermined superimposition functions in step 510, and is further capable to store the plurality of training decay signal traces that are measured in step 540, and the corresponding plurality of the characteristic parameters that are determined in step 550 for the decompositions of the recorded training signal traces into the M predetermined superimposition functions.

The method 400, according to the first aspect of the present disclosure, for determining a type of object 150, 180, 190 arranged in an RF field 140 transmitted by an NFC reader device 100, including the concept of estimating 450 a classification of a recorded decay signal trace for an object arranged in the RF field 140 of an NFC reader device 100, attempting 470 a classification on the basis of the characteristic parameters determined by the decomposition, and if possible the determining the type of the object on the basis of the classification, has been performed and tested using an experimental set up comprising an experimental NFC reader device. Also the method 500, according to the second aspect of the present disclosure, of acquiring a training data set for an NFC reader device 100 for a plurality of training objects 150, 180, 190 from a training group of types of objects, has been performed and tested using an experimental set up comprising an experimental NFC reader device. These tests resulted in a proof that the method, including the underlying concepts of decomposing decay signal traces into superimposed components, and attempting a classification on the basis of the characteristic parameters determined by the decomposition, is feasible and in that the concept is proven.

Results of these tests and the proof of the concept underlying the method 400 for determining a type of object 150, 180, 190 arranged in an RF field 140 transmitted by an NFC reader device 100 and the method 500 of acquiring a training data set for an NFC reader device 100 for a plurality of training objects 150, 180, 190 from a training group of types of objects are documented in the following with reference to the FIGS. 6 to 10.

FIG. 6 includes a left diagram 610 and a right diagram 620, and as such shows a pair of diagrams 610, 620 illustrating, respectively, the output of a front-end processed, decay signal trace 612, 622 having N=30 sample values, and its approximation 614, 624 by decomposition of degree M=3 according to an embodiment of the first aspect of the present disclosure, as follows. FIG. 6, left diagram 610, illustrates the output of the analog-to-digital converter (ADC) in an I-channel, that is ADC I, of a received signal processing chain 122 and its approximation by a decomposition of degree M=3 according to Equation (2) for the N=30 sample values. FIG. 6, right diagram 620, illustrates the output of the analog-to-digital converter (ADC) in a Q-channel, that is ADC Q, of the received signal processing chain 122 and its approximation by the decomposition of degree M=3 for the N=30 sample values. The object in the RF field of the NFC reader device in the experimental set-up was a metal plate, in particular an Aluminium plate having a size of 60 mm×40 mm, which has been arranged at a distance of 5 mm to the antenna of the NFC reader device.

It can be seen in FIG. 3A-FIG. 3F that a decomposition of the decay signal traces 612, 622 of a degree M=3, that is a decomposition 614, 624 which involves only three superimposed components $x_m[n]=a_m z_m^n$ for m=1, 2, and 3, can be fitted to the measured decay signal 612, 622 and provides good approximations 614, 624, both for the real part (I-Channel) and the imaginary part (Q-Channel) of the decay signal trace.

In the sense of the method 400 according to the first aspect of the present disclosure, as illustrated in FIG. 7, it has been checked whether it is possible to separate the object type of metal objects 180 from the object type 150 of NFC tags by analyzing the decay signal trace (more specifically: the scaling $|a_m|$, the phase $\angle a_m$, the damping $|z_m|$, and the frequency $\angle z_m$ of the underlying weighted oscillation function $a_m z_m^n$, for m=1, 2, 3) after the reader field is switched off. To illustrate that this is possible, measurements have been performed with metal sheets 180 and an NFC tag 150 over a distance range from 5-100 mm of the objects from the antenna of the NFC reader device. For all measured decay signal traces, a decomposition with model order M=3 has been estimated, and superimposed components with model orders m=1, 2, 3 have been fitted to the measured decay signal traces. In this analysis, for simplification, the complex-valued weights $a_m$ of the individual weighted oscillation components were neglected; however, they can also be characteristic for certain objects. The resulting parametric representations of $z_m$ in the complex plane are illustrated in FIGS. 7A, 7B and 7C, respectively, for the unloaded cases 190 in representations 711, 721, and 731, for an NFC tag 150 in representations 712, 722, and 732, and for several metal objects in representations 713, 723, and 733.

FIG. 7A, FIG. 7B, and FIG. 7C show respective triples 710, 720, 730 of diagrams illustrating, respectively, oscillatory parameters of a decomposition of a degree M=3 fitted to respective pluralities of measured and recorded decay signal traces for a plurality of unloaded RF fields (representations 711, 721, 731), for a plurality of RF fields loaded with an NFC tag (representations 712, 722, 732), and for a plurality of RF fields loaded with a metal object (representations 713, 723, 733), using the pencil of function method.

FIG. 7A shows a triple 710 of diagrams illustrating, respectively, the first oscillatory parameter $z_1$ of M=3 superimposed components as obtained from fitting decompositions of degree M to a plurality of measured and recorded training decay signal traces for a plurality of training unloaded RF fields (representation 711), for a plurality of RF fields loaded with a training NFC tag (representation 712), and for a plurality of RF fields loaded with a training metal object (representation 713). FIG. 7B shows a triple 720 of diagrams illustrating, respectively, the second oscillatory parameter $z_2$ of M=3 superimposed components as obtained from fitting decompositions of degree M to the plurality of measured and recorded training decay signal traces for the plurality of training unloaded RF fields (representation 721), for the plurality of RF fields loaded with a training NFC tag (representation 722), and for the plurality of RF fields loaded with a training metal object (representation 723). FIG. 7C shows a triple 730 of diagrams illustrating, respectively, the third oscillatory parameter $z_3$ of M=3 superimposed components as obtained from fitting decompositions of degree M to the plurality of measured and recorded training decay signal traces for the plurality of training unloaded RF fields (representation 731), for the plurality of RF fields loaded with a training NFC tag (representation 732), and for the plurality of RF fields loaded with a training metal object (representation 733).

One can see in FIG. 7A that the point clouds, or cluster, for the oscillatory parameter associated to the oscillation component with m=1, i.e. $z_1$, are quite similar for metal objects (representation 713) and the unloaded case (representation 711). Also for NFC tags (representation 712), a first point cloud, or cluster, can be seen, which is quite similar to that for metal objects (representation 713) and for unloaded case (representation 711). This may mean that a presence of a metal object may not be distinguished from an unloaded case on the basis of the characteristic parameters for the oscillation function associated to the superimposed component with m=1, if a classification is to be attempted on the basis of the characteristic parameters for this oscillatory component. This may further mean that the presence of NFC tags, which yield in the decomposition of the decay signal trace the oscillation function associated to the superimposed component with m=1 with characteristic parameters such that it falls in said first point cloud, may not be distinguished from the presence of a metal object and an unloaded case.

However, for NFC tags (representation 712), a second, additional point cloud, or cluster, can be seen, which is closer to the unit circle, meaning that the damping $|z_1|$ is less than for those points of the first point cloud that is closer to the origin of the complex plane. This means that the characteristic parameters of the oscillatory parameter associated to m=1 can be used for a classification of the type of object in the RF field of the NFC reader, wherein NFC tags can be distinguished from metal objects and unloaded cases.

With regard to FIG. 7B, one can see that the point clouds for the oscillatory parameter associated to the oscillation component with m=2, i.e. $z_2$, are quite similar for the unloaded case (representation 721), metal objects (representation 722), and the NFC tags (representation 723), which means that the characteristic parameters of the oscillatory parameter associated to m=2 can hardly be used for a classification. Similarly, with regard to FIG. 7C, one can see that the point clouds for the oscillatory parameter associated to the component with m=3, i.e. $z_2$, are quite similar for the unloaded case (representation 731), metal objects (representation 732), and the NFC tags (representation 733), and may hardly contribute to a classification between these types of objects.

The point clouds seen in FIG. 7A, FIG. 7B, and FIG. 7C can be resolved in respect of the distance to the antenna of the NFC reader device, at which distance the respective object has been arranged in the RF field. The results as resolved for the distance are shown in FIG. 8A-FIG. 8C.

FIG. 8A-FIG. 8C show respective pairs of diagrams illustrating, respectively, the absolute values of the first to third oscillatory parameters of respective decompositions of a degree M=3 and the angles of the first to third oscillatory parameters of the respective decompositions of degree M=3 fitted to respective pluralities of measured and recorded decay signal traces for a plurality of RF fields loaded with an NFC tag as a function of the distance of the NFC tag to the antenna of the NFC reader device, and for a plurality of RF fields loaded with a metal object as a function of the distance of the NFC tag to the antenna of the NFC reader device, as follows.

FIG. 8A shows respective pairs 811-812 and 813-814 of diagrams illustrating, respectively, the absolute values of the first oscillatory parameter $z_1$ of the respective decompositions of degree M=3 for NFC tags (diagram 811) and metal objects (diagram 812) and the angles of the first oscillatory parameter $z_1$ of the respective decompositions of degree M=3 for NFC tags (diagram 813) and metal objects (diagram 814). FIG. 8B shows respective pairs 821-822 and 823=824 of diagrams illustrating, respectively, the absolute values of the second oscillatory parameter $z_2$ of the respective decompositions of degree M=3 for NFC tags (diagram 821) and metal objects (diagram 822) and the angles of the second oscillatory parameter $z_2$ of the respective decompositions of degree M=3 for NFC tags (diagram 823) and metal objects (diagram 824). FIG. 8C shows respective pairs of diagrams 831-832 and 833-834 illustrating, respectively, the absolute values of the third oscillatory parameter $z_3$ of the respective decompositions of degree M=3 for NFC tags (diagram 831) and metal objects (diagram 832) and the angles of the third oscillatory parameter $z_3$ of the respective decompositions of degree M=3 for NFC tags (diagram 833) and metal objects (diagram 834).

In FIG. 8A (diagram 811), it can be seen that the points in FIG. 7A (representation 712) closer to the unit circle can be associated to NFC tags that are in close vicinity of the NFC reader device. The less damping and associated longer decay time is a result of the resonance characteristics of the NFC tags.

This is justified by the observation that the variance of the frequency, i.e. the angle $\angle z_m$ of $z_m$, see lower left panel 813 in FIG. 8A, decreases at closer distances, which appears to indicate a stronger manifestation of the resonance frequency of the NFC tag in the decaying signal. The results shown in FIG. 8A indicate that the presence of an NFC tag can be distinguished from the presence of a metal object in particular when these types of objects are arranged in the vicinity of the RF antenna, i.e. at a close distance of less than approximately 25 millimeters to the RF antenna.

Furthermore, one can see in FIG. 8A and FIG. 8B that the two characteristic parameters $|z_1|$ and $|z_2|$ for an NFC tag (see diagrams 811 and 821) both vary depending on the distance of the object from the antenna of the NFC reader device, contrary to the distance dependencies for the two characteristic parameters $|z_1|$ and $|z_2|$ for metal objects (see diagrams 812 and 822).

Figure 9:
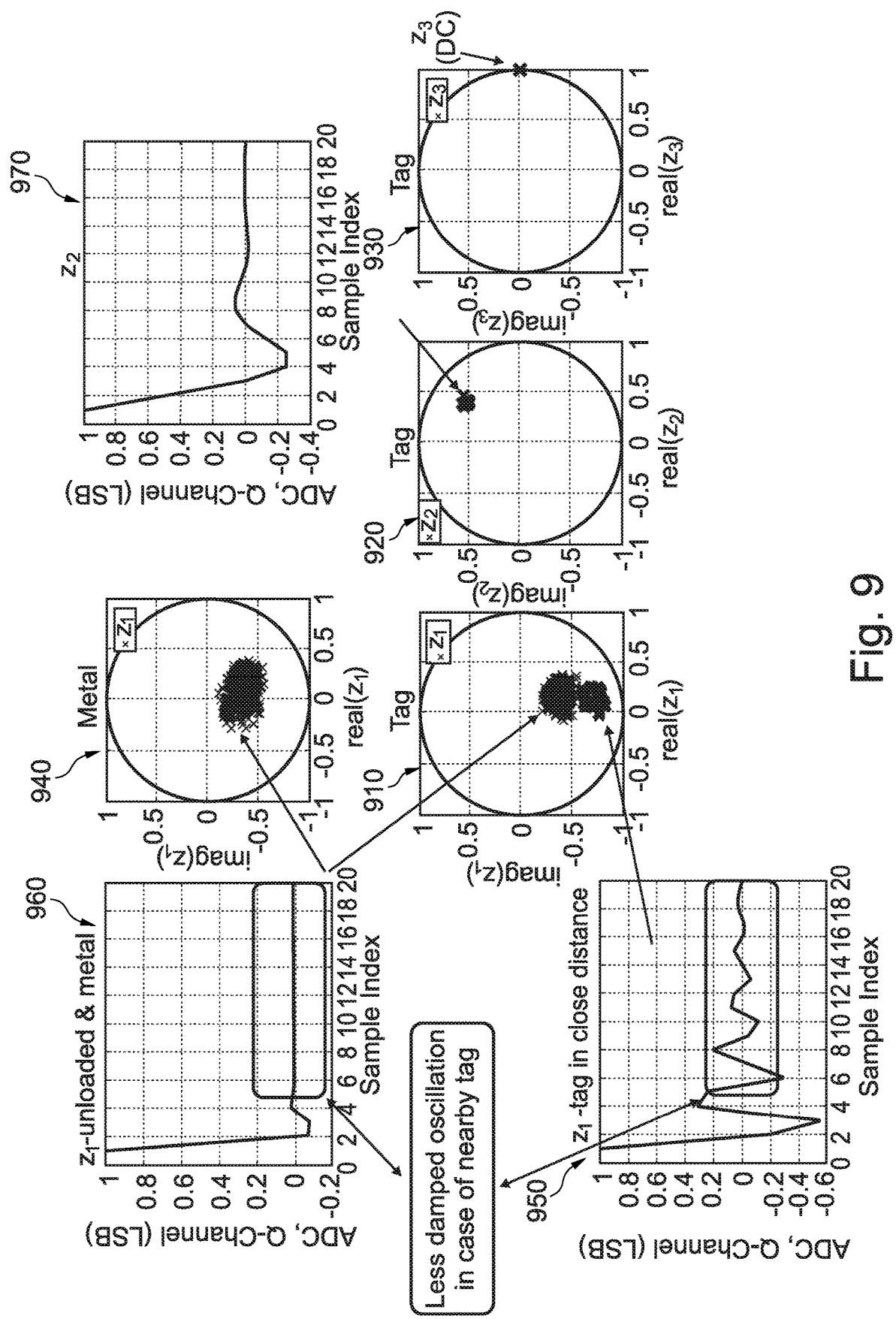
FIG. 9 shows in the respective complex plane diagrams showing respective pluralities of oscillatory parameters $z_1$, $z_2$, $z_3$ for respective decompositions of training decay signal traces for training tags and a pluralities of oscillatory parameters $z_1$ for respective decompositions of training decay signal traces for training metal plates, and diagrams showing the associated oscillation functions in the time domain as a function of the discrete time index.

The corresponding time-domain shapes of the individual components in FIG. 7A, representation 712 for NFC tags and representation 713 for metal objects, are illustrated in FIG. 9.

FIG. 9 shows in the respective complex plane diagrams showing respective pluralities of oscillatory parameters $z_1$, $z_2$, $z_3$ for respective decompositions of training decay signal traces for training NFC tags (see representations 910, 920, 930) and a pluralities of oscillatory parameters $z_1$ for respective decompositions of training decay signal traces for training metal plates (see representation 940), and diagrams 950 (for NFC tag) and 960 (for metal object) showing the associated oscillation functions in the time domain as a function of the discrete time index (or sample index).

In the representation 910 and the diagram 950 one can see that the characteristic parameters close to the unit circle (in representation 910) of the oscillatory parameter associated with m=1 for NFC tags correspond to the oscillation function being less strongly damped and hence exhibiting a longer decay time (in diagram 950) as compared to the characteristic parameters for metal objects that are closer to the centre of the unit circle (in representation 940) for metal objects, which correspond to the oscillation function being more strongly damped and hence exhibiting a short decay time (in diagram 960) and hence no lasting oscillations after longer times (higher sample indices).

Further experiments have been conducted with more and different NFC tags (three different tags), and more and different metal plates (four different metal plates). The results are displayed in FIG. 10.

FIG. 10 shows respective sets 1010 and 1020 of complex plane diagrams 1011, 1012, 1013, 1014 for a plurality of (in particular three) training NFC tags and complex plane diagrams 1021, 1022, 1023, 1024 for a plurality of (in particular four) training metal objects. The first set 1010 shows respective pluralities of oscillatory parameters $z_1$, $z_2$, $z_3$ for respective decompositions of training decay signal traces for a plurality of training tags arranged in an RF field of an NFC reader device at four different distances, viz. farfield (see diagram 1011), 50 mm (see diagram 1012), 30 mm (see diagram 1013), and 5 mm (see diagram 1013).

The second set 1020 of complex plane diagrams shows respective pluralities of oscillatory parameters $z_1$, $z_2$, $z_3$ for respective decompositions of training decay signal traces for a plurality of training metal objects arranged in an RF field of an NFC reader device at four different distances, viz. far field (see diagram 1021), 50 mm (see diagram 1022), 30 mm (see diagram 1023), and 5 mm (see diagram 1024).

One can see, in particular from the diagrams 1014 and 1024 for objects in close vicinity (5 mm) to the antenna, that the characteristic parameters, in particular oscillatory parameters, resulting for decompositions of model order M=3 do not only differ between NFC tags and metal objects, but also among the different NFC tags, see the distinguishable point clouds for $z_1$, and $z_2$ in the diagram 1014.

The results shown illustrated in the diagram 1014, viz. that it is even possible to differ between different NFC tags, may also open the door to classifying certain NFC tags in order to optimize settings of an NFC reader device for specific communication scenarios with different NFC tags, or similar applications.

It is important to note that the method according to the first aspect of the present disclosure for determining a type of an object arranged in an RF field transmitted by an NFC reader device 100 can be used on top of any other state-of-the-art LPCD mechanisms and methods to improve object recognition performance and power saving efficiency.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

The invention claimed is:

1. A method for determining a type of an object arranged in a radio frequency, RF, field transmitted by a near field communication, NFC, reader device, in particular an NFC enabled reader device, wherein the type of object is from a predetermined group of types of objects, wherein the NFC reader device has an RF antenna for transmitting an RF field and for receiving an RF input signal, and a received signal processing chain for front-end processing a received RF input signal and for providing as its output a front-end processed, received signal, x, corresponding to the received RF input signal, and wherein the method has the following steps:
a) for an object that is in an RF field transmitted from the NFC reader device, after switching off the transmitted RF field, measuring and recording a decay signal trace of a front-end processed received signal caused by said object in the RF field;
b) estimating a decomposition of a degree M according to a predetermined decomposition scheme, of the recorded decay signal trace caused by said object into M superimposed components of the decomposition scheme, and thereby determining, and in particular storing, for each superimposed component, an associated set of estimated characteristic parameters of the superimposed component, wherein each one of said M superimposed components is defined by a predetermined superimposition function, which in turn is determined said set of characteristic parameters;
c) on the basis of at least one of the determined estimated characteristic parameters of the M superimposed components according to the decomposition scheme, attempting a classification of said at least one of the characteristic parameters with respect to a training data set of training characteristic parameters of the M superimposed components.

2. The method according to claim 1, further having the step:
d) if the classification of said at least one of the estimated characteristic parameters is successful, on the basis of the successful classification, determining the type of object, for which the decay signal trace has been recorded in step a).

3. The method according to claim 1, having at least one of the following features:
i) wherein the group of types of objects comprises at least one of an NFC tag, a metal object and a no loading with any object;
ii) wherein the NFC reader device has a processing and evaluation, P&E, unit for processing and evaluating a front-end processed received signal, wherein in step a) the decay signal trace is recorded and stored in the P&E unit, and wherein step b), step c), and step d) are performed in the P&E unit;
iii) wherein the training data set is stored in a database that is accessible to the P&E unit and has been obtained during a training phase for the NFC reader device using a plurality of training objects from each type of object in the predetermined group of types of objects;
iv) wherein the measuring and recording of the decay signal trace in step a) comprises: recording a time dependency of the decay signal trace during a time interval that starts at or after the time of the switching off of the RF field, in particular that starts after a predetermined time delay after the time of the switching off of the RF field, wherein the decay signal values are complex-valued;
v) wherein the estimating the decomposition of a degree M according to a predetermined decomposition scheme in step b) comprises fitting the decomposition of the degree M to the recorded decay signal trace by varying the associated characteristic parameters of the M superimposed components of the estimated decomposition.

4. The method according to claim 3 having at least feature iv), wherein the measuring and recording of the decay signal trace in step a) comprises: recording a time dependency of the decay signal trace in the form of a time series of signal values x[n], wherein n denotes a discrete time index, wherein x[n] is complex-valued and has:
a real part, real (x[n]), and an imaginary part, imag (x[n]), and/or
an absolute value, |x[n]|, and an angle, ∠x[n].

5. The method according to claim 4, wherein the estimating a decomposition of degree M of the recorded decay signal trace in step b) comprises: modelling the time series of signal values x[n] as a sum of M superimposed components $x_m[n]$ plus a term d[n] representing white noise according to:

$$x[n] = d[n] + \sum_{m=1}^{M} x_m[n], \text{ with } n \in [0, N-1], \quad (1)$$

wherein N is the number of measured signal samples, n is a discrete time index corresponding to a measured signal sample, m is an index denoting a superimposed component $x_m[n]$ with m=[1, M], M is the number of superimposed components $x_m[n]$ admitted in the decomposition, and n, N, m, and M are integers.

6. The method according to claim 5, wherein the M superimposed components $x_m[n]$ represent a decomposition of the decay signal trace into a set of superimposition functions, which set is selected from a group of sets that consists of: a set of oscillatory functions, in particular a set of weighted oscillatory functions, a set of sinusoidal functions, in particular a set of weighted sinusoidal functions, a set of impulse functions, in particular a set of weighted impulse functions, and a set of step functions, in particular a set of weighted step functions.

7. The method according to claim 4, wherein the estimating a decomposition of degree M of the recorded decay signal trace in step b) comprises: modelling the time series of signal values x[n] as a sum of M superimposed components $a_m z_m^n$ plus a term d[n] representing white noise according to $$x[n] = d[n] + \sum_{m=1}^{M} a_m z_m^n, \text{ with } n \in [0, N-1], \quad (2)$$

wherein N is the number of measured signal samples, n is a discrete time index corresponding to a measured signal sample, m is an index denoting a weighted oscillation component $a_m z_m^n$ with m=[1, M], M is the number of weighted oscillation components admitted in the decomposition, and n, N, m, and M are integers, and
wherein each superimposed component is represented as a weighted oscillation component $a_m z_m^n$, wherein $z_m$ is a complex-valued oscillatory parameter according to the predetermined decomposition scheme, $z_m^n := z_m[n]$ represents an oscillation function associated to $z_m$ and is namely the n-th value of the oscillation function corresponding to the discrete time index n, and $a_m$ is a complex-valued weight parameter.

8. The method according to claim 7, having at least one of the following features:

i) wherein the complex-valued oscillatory parameter $z_m$ is mapped to the oscillation function of the discrete time index n by $$z_m^n = \left(|z_m|e^{i\angle z_m}\right)^n = |z_m|^n e^{i\angle z_m n}; \qquad (3)$$

ii) wherein a weighted oscillation component $a_m z_m^n$ is given as a function of the discrete time index n by:

$$a_m z_m^n = a_m\left(|z_m|e^{i\angle z_m}\right)^n = a_m|z_m|^n e^{i\angle z_m n}; \qquad (4)$$

in particular wherein in feature i) and in feature ii) the linear frequency $f_m$ of the weighted oscillation component m and $\angle z_m$ are connected as follows:

$$\angle z_m = 2\pi \frac{f_m}{f_s}, \qquad (5)$$

wherein $f_s$ denotes the sampling frequency.

9. The method according to claim 7, wherein each weighted oscillation component $a_m z_m^n$ is represented by a subset of characteristic parameters, which subset comprises the absolute value of the weight parameter, i.e., $|a_m|$, the angle of the weight parameter, i.e. $\angle a_m$, the absolute value of the oscillatory parameter, $|z_m|$, the angle of the oscillatory parameter, i.e. $\angle z_m$, wherein each subset of characteristic parameters can be summarized as a vector $\theta_m$:

$$\theta_m^T = [|a_m| \angle a_m |z_m| \angle z_m], \qquad (6)$$

wherein $\cdot^T$ indicates a transposed vector, and
wherein a parameter matrix $\theta$ is defined in terms of the vectors $\theta_m$ as:

$$\Theta = [\theta_1 \ \theta_2 \ \ldots \ \theta_M], \qquad (7)$$

such that the parameter matrix $\theta$ contains a complete set of characteristic parameters for all M superimposed components, wherein in particular the absolute, value of a respective weight parameter corresponds to a scaling of the oscillatory component, the angle of a respective weight parameter corresponds to a phase shift of the oscillatory component, and in particular wherein the absolute value of the oscillatory parameter corresponds to the damping of the oscillation function, and the angle of the oscillatory parameter corresponds to a frequency of the oscillation function.

10. The method according to claim 9, wherein the attempting a classification of said M characteristic parameters with respect to the training data set comprises: performing a classification of a subset of characteristic parameters including at least one of: the absolute value of the weight parameter, the angle of the weight parameter, the absolute value of oscillatory parameter, and the angle of the oscillatory parameter M=3, that is for m=1, 2, and 3, preferably for M=2, that is for m=1, and 2, and more preferably for M=1, that is for m=1, with respect to a corresponding set of training characteristic parameters included in a training, data set.

11. The method according to claim 1, having at least one of the following features:

i) wherein the estimating the decomposition of degree M of the recorded decay signal trace and the determining the associated set of estimated characteristic parameters in step b) comprises a fitting the decomposition of the degree M to the recorded decay signal trace by varying the characteristic parameters of the associated set of estimated characteristic parameters of the superimposed components of the estimated decomposition, and wherein the determining the associated set of estimated characteristic parameters involves a mathematical method that is selected from the group Prony's method, pencil-of-function methods, and (total) least squares estimators;

ii) wherein the attempting a classification in step c) involves a mathematical method that is selected from a group that consists of: a Bayesian classification, a support vector machine, and an artificial neural network.

12. A method of acquiring, in particular in a database, a training data set for an NFC reader device, in particular an NFC enabled reader device, for a plurality of training objects from a training group of types of objects, wherein the training data set comprises a plurality of recorded training decay signal traces for each of at least one training object of a type that is selected from the training group of types of objects, wherein the NFC reader device has an RF antenna for transmitting an RF field and for receiving an RF input signal, and a received signal processing chain for front-end processing a received RF input signal and for providing as its output a front-end processed, received signal, x, corresponding to the received RF input signal, and wherein the method has the following steps:

1) Predetermining a training group of types of objects;
2) Predetermining a decomposition scheme with a degree M for decomposing a decay signal trace into M superimposed components, wherein each one of said M superimposed components is defined by a predetermined superimposition function, which in turn is determined by said associated set of characteristic parameters, and storing, in particular in a database, an indication of the decomposition scheme and the M predetermined superimposition functions;
3) For each predetermined type of objects:
   3.1) providing a plurality of different training objects of said predetermined type of objects,
   3.2) sequentially bringing each training object of the provided plurality of different training objects into a transmitted RF field of the NFC reader device,
   3.3) for each training object that is in the transmitted RF field of the NFC reader device, performing the following steps:
      3.3.1) after switching off the RF field of the NFC reader device, measuring and recording, in particular in the database, a training decay signal trace of a front-end processed received signal caused by said training object in the RF field, 3.3.2) estimating a decomposition of degree M of the recorded training decay signal trace according to the predetermined decomposition scheme into M superimposed components, and thereby determining, and in particular storing, in particular in the database, for each superimposed component, an associated set of determined characteristic training parameters of the superimposed component of the estimated decomposition of the training decay signal trace caused by the training object in the RF field.

13. The method of claim 12, having at least one of the following features:
   i) wherein the training group of types of objects comprises at least one of an NFC tag, a metal object and a no loading with any object,
   ii) wherein the NFC reader device has a processing and evaluation, P&E, unit for processing and evaluating a front-end processed received signal;
   iii) wherein the NFC reader device has a database that is accessible for the P&E unit;
   iv) wherein in step 2), the storing of an indication of the decomposition scheme and the M predetermined superimposition functions is performed in in a database that is accessible for the P&E unit, wherein in step 3.3.1) the training decay signal trace is stored in the database, and wherein in step 3.3.2) the characteristic training parameters are stored in the database;
   v) wherein the measuring and recording in the database in step 3.3.1) comprises:
   recording a time dependency of the training decay signal trace in the form of a time series of training signal values x[n], wherein n denotes a discrete time index, wherein x[n] is complex-valued and has:
      a real part, real (x[n]), and an imaginary part, imag (x[n]), and/or
      an absolute value, |x[n]|, and an angle, $\angle$x[n].

14. The method according to claim 13 having feature v), wherein the estimating a decomposition of degree M of the recorded decay signal trace in step 3.3.2) comprises: modelling the time series of signal values x[n] as a sum of M superimposed components $x_m[n]$ plus a term d[n] representing white noise according to:

$$x[n] = d[n] + \sum_{m=1}^{M} x_m[n], \text{ with } n \in [0, N-1], \quad (1)$$

wherein N is the number of measured signal samples, n is a discrete time index corresponding to a measured signal sample, m is an index denoting a superimposed component $x_m[n]$ with m=[1, M], M is the number of superimposed components $x_m[n]$ admitted in the decomposition, and n, N, m, and M are integers.

15. The method according to claim 14, wherein the M superimposed components $x_m[n]$ represent a decomposition of the decay signal trace into a set of superimposition functions, which set is selected from a group of sets that consists of: a set of oscillatory functions, in particular a set of weighted oscillatory functions, a set of sinusoidal functions, in particular a set of weighted sinusoidal functions, a set of impulse functions, in particular a set of weighted impulse functions, and a set of step functions, in particular a set of weighted step functions.

16. The method of claim 13 having feature v), wherein the estimating the predetermined decomposition of degree M in step 3.3.2) comprises: modelling x[n] as a sum of M weighted oscillation components plus a term d[n] representing white noise according to $$x[n] = d[n] + \sum_{m=1}^{M} a_m z_m^n, \text{ with } n \in [0, N-1], \quad (2)$$

wherein N is the number of measured training signal samples, n is a discrete time index corresponding to a measured training signal sample, m is an index denoting a weighted oscillation component $a_m z_m^n$ with m=[1, M], M is the number of weighted oscillation components admitted in the decomposition, and n, N, m, and M are integers, and wherein each superimposed component is represented as a weighted oscillation component $a_m z_m^n$, wherein $z_m$ is a complex-valued oscillatory parameter according to the predetermined decomposition scheme, $z_m^n := z_m[n]$ represents an oscillation function associated to $z_m$ and is namely the n-th value of the oscillation function corresponding to the discrete time index n, and $a_m$ is a complex-valued weight parameter;

in particular further having at least one of the following features:
   i) wherein the complex-valued oscillatory parameter $z_m$ is mapped to a function of the discrete time index n by $$z_m^n = \left(|z_m| e^{i \angle z_m}\right)^n = |z_m|^n e^{i \angle z_m n}; \quad (3)$$

ii) wherein a weighted oscillation component $a_m z_m^n$ is given as a function of the discrete time index n by:

$$a_m z_m^n = a_m \left(|z_m| e^{i \angle z_m}\right)^n = a_m |z_m|^n e^{i \angle z_m n}; \quad (4)$$

in particular wherein in feature i) and in feature ii) the linear frequency $f_m$ of the weighted oscillation component m and $\angle z_m$ are connected as follows:

$$\angle z_m = 2\pi \frac{f_m}{f_s}, \quad (5)$$

wherein $f_s$ denotes the sampling frequency.

17. The method of claim 12, wherein the method is implemented as a computer program product comprising executable instructions and stored in a machine-readable, non-transitory storage medium, the instructions, when executed on a processor, perform the method.

* * * * *